United States Patent
Higashiyama et al.

(10) Patent No.: US 6,890,673 B2
(45) Date of Patent: May 10, 2005

(54) HYDROGEN PRODUCING APPARATUS AND POWER GENERATING SYSTEM USING IT

(75) Inventors: Kazutoshi Higashiyama, Hitachi (JP); Masahiro Komachiya, Hitachinaka (JP); Kiyoshi Hiyama, Hitachi (JP); Tomoichi Kamo, Tokai (JP); Noriyuki Imada, Kure (JP); Tetsurou Okano, Hiroshima (JP); Hiroyuki Kaku, Hiroshima (JP)

(73) Assignees: Hitachi, Ltd., Tokyo (JP); Babcock-Hitachi Kabushiki Kaisha, Tokyo (JP)

( * ) Notice: Subject to any disclaimer, the term of this patent is extended or adjusted under 35 U.S.C. 154(b) by 204 days.

(21) Appl. No.: 10/068,837

(22) Filed: Feb. 11, 2002

(65) Prior Publication Data

US 2003/0008187 A1 Jan. 9, 2003

(30) Foreign Application Priority Data

Jul. 4, 2001 (JP) .................................. 2001-203429
Sep. 11, 2001 (JP) .................................. 2001-274920

(51) Int. Cl.$^7$ ................................................ H01M 8/04
(52) U.S. Cl. ............................. 429/20; 429/22; 429/24; 422/114
(58) Field of Search ........................... 700/268; 429/19, 429/20, 22, 24; 422/105, 114, 115

(56) References Cited

U.S. PATENT DOCUMENTS 5,648,182 A * 7/1997 Hara et al. ..................... 429/20
6,383,670 B1 * 5/2002 Edlund et al. ................. 429/20
6,420,060 B1 * 7/2002 Yamamoto et al. ........... 429/24
6,497,970 B1 * 12/2002 Fronk ........................ 429/19 X
6,586,126 B1 * 7/2003 Ogawa et al. ................ 429/22
6,613,465 B2 * 9/2003 Yamaoka et al. ......... 429/20 X
2002/0048698 A1 * 4/2002 Fronk .......................... 429/19

FOREIGN PATENT DOCUMENTS

JP 11-317234 11/1999
JP 2000-53403 2/2000

OTHER PUBLICATIONS

Hiroo Tominaga and Masakazu Tamaki (supervision), "Chemical Reaction and Reactor Design", Maruzen Co., Ltd., 1996, pp. 220–223 (No Month).

* cited by examiner

Primary Examiner—Stephen J. Kalafut
(74) Attorney, Agent, or Firm—Dickstein Shapiro Morin & Oshinsky LLP

(57) ABSTRACT

For the stabilization of the reaction, especially, for maintaining reaction temperature, the feedback control by the feedback unit is performed for to the supply of air (, oxygen, or oxidizing agent), whereas other materials are supplied by the open-loop control according to the instruction of the flow selection unit which indicates a preset value depending on the required hydrogen production volume. In addition, the continuous flow setting unit capable of changing the flow continuously is employed for the supply system of the air, whereas the flow control of the other materials is performed by use of the discrete flow setting units each of which provides the discretized flow by use of the on-off combination of two or more on-off valves.

13 Claims, 13 Drawing Sheets

EXPLANATION ON CHANGE OF SUPPLIED AIR VOLUME
(UNDER OPERATION MODE SWITCHING
AND EXTERNAL PERTURBATION)

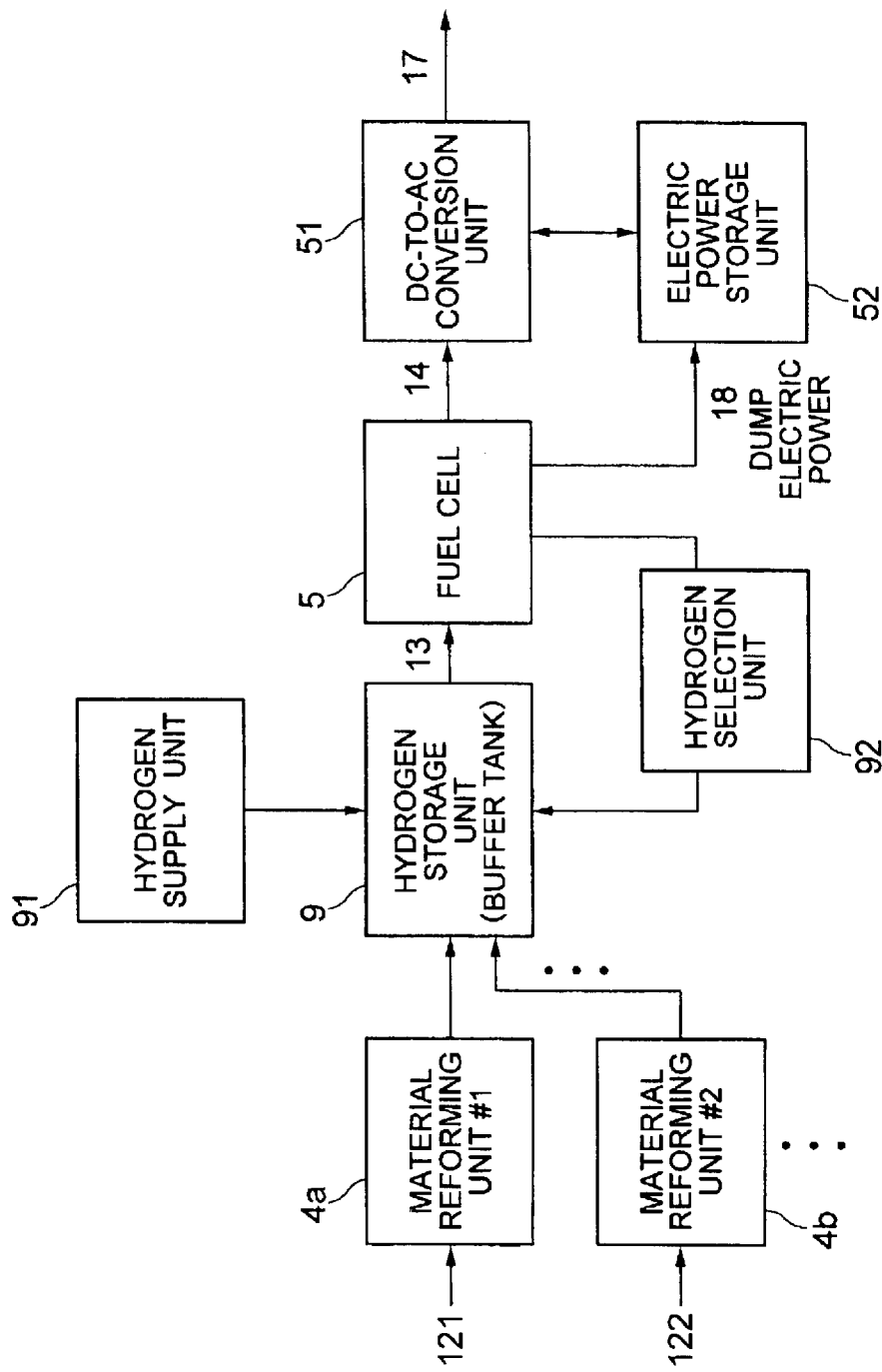

HYDROGEN PRODUCING APPARATUS AND POWER GENERATING SYSTEM USING IT

BACKGROUND OF THE INVENTION

The present invention relates to a hydrogen producing device (reforming device) for producing gas containing hydrogen by use of air (, oxygen, or an oxidizing agent) and materials such as hydrocarbons and water, and a fuel cell power generation system using the hydrogen producing device.

As production processes for industrially producing hydrogen, various techniques are known. On page 221 of a document: Hiroo Tominaga and Masakazu Tamaki (supervision) "Chemical Reaction and Reactor Design" (Maruzen Co., Ltd. 1996), various processes or techniques such as: ① electrolysis of water; ② gasification of coal/coke; ③ steam reforming of hydrocarbons; ④ partial oxidation of hydrocarbons; and ⑤ dehydrogenation of hydrocarbons, are shown. Historically, processes ① and ② are precursory, and processes ③ and ④ using petroleum hydrocarbons or natural gas hydrocarbons are becoming the mainstream at present.

Such processes have been developed mainly for producing hydrogen for ammonia synthesis, however, the processes are also being investigated as basic processes for hydrogen production for the application to fuel cell power generation systems. In fuel cell power generation systems, electric power is generated using hydrogen as a main material.

For example, in JP-A-2000-53403, a control method for a hydrogen production process, using an aqueous solution of methanol as a material and combining a steam reforming reaction with a partial oxidation reaction, has been disclosed. In the control method, the temperature of a reaction part is monitored and thereby the amount of oxygen to be supplied to the reaction part is calculated and determined in real time based on a theoretical reaction model considering the reaction heat. Generally, if the amount of the supplied material is controlled based on the theoretical reaction model, fine and precise reaction control (above all, stabilization of reaction temperature) becomes easier.

The stabilization of reaction temperature is especially important when a hydrogen production method called "combined reforming method (autothermal reforming method)" is employed.

The key feature of the combined reforming method is that a steam reforming reaction (endothermic reaction) is combined with a partial oxidation reaction (exothermic reaction) and suitable reaction temperature is maintained by keeping a proper balance between the two reactions. The proper balance between the reactions is realized by controlling the amounts of the supplied materials. Heat necessary for the reactions is autonomously supplied, and thus external heating means becomes unnecessary and consequently, simplification of the hydrogen producing device becomes possible and it is possible to make full use of the feature of the steam reforming reaction having high hydrogen production efficiency.

On the other hand, in order to make full use of the features of the combined reforming method, a method for controlling the amounts of the supplied materials capable of maintaining the proper reaction temperature under various practical environments where external perturbation is expected becomes necessary. Of course, it is needless to say that the stabilization of reaction is practically essential even when methods other than the combined reforming method are employed.

However, according to the control methods shown in the above references, the hardware necessary for the control inherently becomes sophisticated. Because, the sophisticated flow detection device and the sophisticated flow control devices become necessary in order to detect the flows of various materials and to carry out the fine and precise control based on the detected result. As a result, the cost for the whole system adds up, so that the application of the techniques is necessitated to be limited.

On the other hand, if the simple and easy flow detection and control of the supply amount and the simple and easy hardware associated therewith are employed for all the materials for the hydrogen production in order to reduce the cost, the stabilization of reaction becomes difficult in practical use. Especially, in the case where the combined reforming method is employed, the maintenance of the proper reaction temperature becomes difficult.

SUMMARY OF THE INVENTION

In consideration of the above problems, an object of the present invention is to provide a hydrogen producing device by which the maintenance of the reaction temperature is possible and the control can be carried out easily, and a fuel cell electric power generation system using the hydrogen producing device.

In consideration of the above problems, the present invention proposes a system which executes feedback control for only the supply of a specific material that is essential for the stabilization of the reaction (especially, the maintenance of the proper reaction temperature), and supplies other materials by means of open-loop control according to set values which have previously been determined corresponding to various required hydrogen production volumes.

Differently from a method of calculating a supply volume in real-time based on the theoretical reaction model, the controlling load becomes light in feedback control based on the deviation of an observed temperature from a target temperature. Further, there is no danger of improper control that is caused by the difference between an assumed reaction model and the actual reaction. Furthermore, sophisticated devices for flow detection/control becomes unnecessary for materials other than the specific material which is the target of feedback, since the flow of each of the other materials can be set by selecting a proper flow corresponding to the required hydrogen production volume.

It varies depending on the application fields how many production volumes should be assumed and prepared as the required hydrogen production volume. For a fuel cell power generation system as a home-use distributed power source for example, at most several values (including "stop") are enough for practical use.

As the aforementioned specific supplied material that is essential for maintaining the reaction temperature, the present inventors focus attention on air, oxygen, or oxidizing agents capable of functioning equivalently to air or oxygen.

When catalytic agents which are used for accelerating oxidation reaction is put out of a hermetic container after the reaction, sometimes the catalytic agents restart heating up intensely. Such phenomenon occurs due to acceleration of oxidation reaction which is caused by exposure of materials remaining on the surfaces of the catalytic agents to oxygen in the air. Therefore, the control of temperature can be carried out quickly and securely by controlling the amount of air (, oxygen, or oxidizing agent) which is supplied to the reaction part. Incidentally, in the following, the air, oxygen, or oxidizing agent is handled specially and distinguished from other materials. When term "each material" is used, the term mainly denotes each material other than the air, oxygen, or oxidizing agent among the supplied materials.

The present invention for resolving the above problems is as in the following.

In accordance with an aspect of the present invention, there is provided a hydrogen producing device for supplying at least one type of material to a reaction part together with air, oxygen, or an oxidizing agent to produce hydrogen by a specific chemical reaction, wherein: for the at least one type of material, supply amount of each material is set by selecting one from two or more set values which are previously determined corresponding to required hydrogen production volumes; and for the air, oxygen, or oxidizing agent, supply amount of the air, oxygen, or oxidizing agent is varied and controlled so that a temperature of the reaction part is within a preset temperature range.

In the above description, term "two or more set values" denotes the supply volumes of materials that are capable of attaining corresponding the required hydrogen production volumes stably in an ordinary environment with relatively small external perturbation. With regard to variation or fluctuation of the chemical reaction (especially, temperature variation or fluctuation) occurring temporarily or abruptly in practical environments, necessary control is carried out by conducting feedback control to the supply volume of the air, oxygen, or oxidizing agent.

In accordance with another aspect of the present invention, there is provided a hydrogen producing device for supplying at least one type of material to a reaction part together with air, oxygen, or an oxidizing agent to produce hydrogen by a specific chemical reaction, wherein: for the at least one type of material, supply amount of each material is set by on/off combination of two or more valves each of which is capable of providing a preset flow; and for the air, oxygen, or oxidizing agent, supply amount of the air, oxygen, or oxidizing agent is set by controlling at least one of opening of a variable-flow valve, a supply pressure of the air, oxygen, or oxidizing agent, and blower discharge amount so that temperature of the reaction part is within a preset temperature range.

The aforementioned "valves" that are only required on-off action (hereafter, referred to as "on-off valves") are relatively cheap and easy to control in comparison with control valves which are generally used for flow control. Therefore, a combination of such on-off valves (cheap and easy to control) are used for the control of each material other than air, oxygen, or oxidizing agent, and flow control of the air, oxygen, or oxidizing agent is carried out by employing control of a variable-flow valve (control valve which is generally used for flow control), air supply pressure control, and/or blower revolving speed control.

In accordance with another aspect of the present invention, there is provided a hydrogen producing device for supplying at least one type of material to a reaction part together with air, oxygen, or an oxidizing agent to produce hydrogen by a specific chemical reaction, wherein: for the at least one type of material, supply amount of each material is set by selecting one from n1 set values which are previously determined corresponding to required hydrogen production volumes; and for the air, oxygen, or oxidizing agent, supply amount of the air, oxygen, or oxidizing agent is set by selecting one from predetermined n2 set values, n1 being smaller than n2.

In the above aspect, although the flow (the quantity of flow) is discretized with regard to both the other materials and the air, oxygen, or oxidizing agent, flow control with finer steps can be carried out for the air, oxygen, or oxidizing agent by satisfying condition "n1<n2".

In accordance with another aspect of the present invention, there is provided a hydrogen producing device for supplying at least one type of material to a reaction part together with air, oxygen, or an oxidizing agent to produce hydrogen by a specific chemical reaction, wherein: each of supply systems for the air, oxygen, or oxidizing agent and the at least one type of material is provided with flow setting means; and flow setting is performed so that at least one of the flow setting means opens the supply system during a time period T2 in a preset time period T1 and an average supply flow in the time period T1 becomes a desired value. Further, the time period T2 is varied depending on status of hydrogen production operation such as alteration of a required hydrogen production volume.

In the above aspect, on-off valves whose on-off time is controlled can be employed as the above flow setting means. The time period T2 which corresponds to a valve opening time is varied depending on the required hydrogen production volume. With regard to the flow setting means for the air, oxygen, or oxidizing agent, the time period T2 is varied for feedback amount with respect to reaction temperature etc.

According to any one of the above hydrogen producing devices, the use of control requiring relatively sophisticated hardware is limited to the flow control of the air, oxygen, or oxidizing agent, and the flow control for the other materials is conducted by use of relatively simple hardware which sets only values which are previously stored corresponding to the required hydrogen production volumes. Accordingly, the hydrogen producing device capable of realizing the stability of the temperature control in practical use while reducing the total cost can be provided.

Further, as an application of the hydrogen producing device in accordance with the present invention, there is provided a fuel cell electric power generation system which employs the hydrogen producing device of the present invention as an internal source of hydrogen.

In consideration of the application of the hydrogen producing device to a fuel cell, the step-like variation occurring on the switching or alteration of the hydrogen production volume, or pulsation of the supplied hydrogen volume occurring due to the time control of the on-off valves has ill effects on the fuel cell.

In order to resolve the above problem, another fuel cell electric power generation system is provided, in which hydrogen storage means (buffer tank) is provided after the outlet of the hydrogen producing device in accordance with the present invention. The step-like variation and pulsation can be absorbed and reduced by the hydrogen storage means (buffer tank).

BRIEF DESCRIPTION OF THE DRAWINGS

FIG. 13 is an explanatory diagram of a hydrogen producing device in accordance with a fourth embodiment of the present invention, and a fuel cell power generation system employing the hydrogen producing device.

DETAILED DESCRIPTION OF THE EMBODIMENTS

Figure 1:
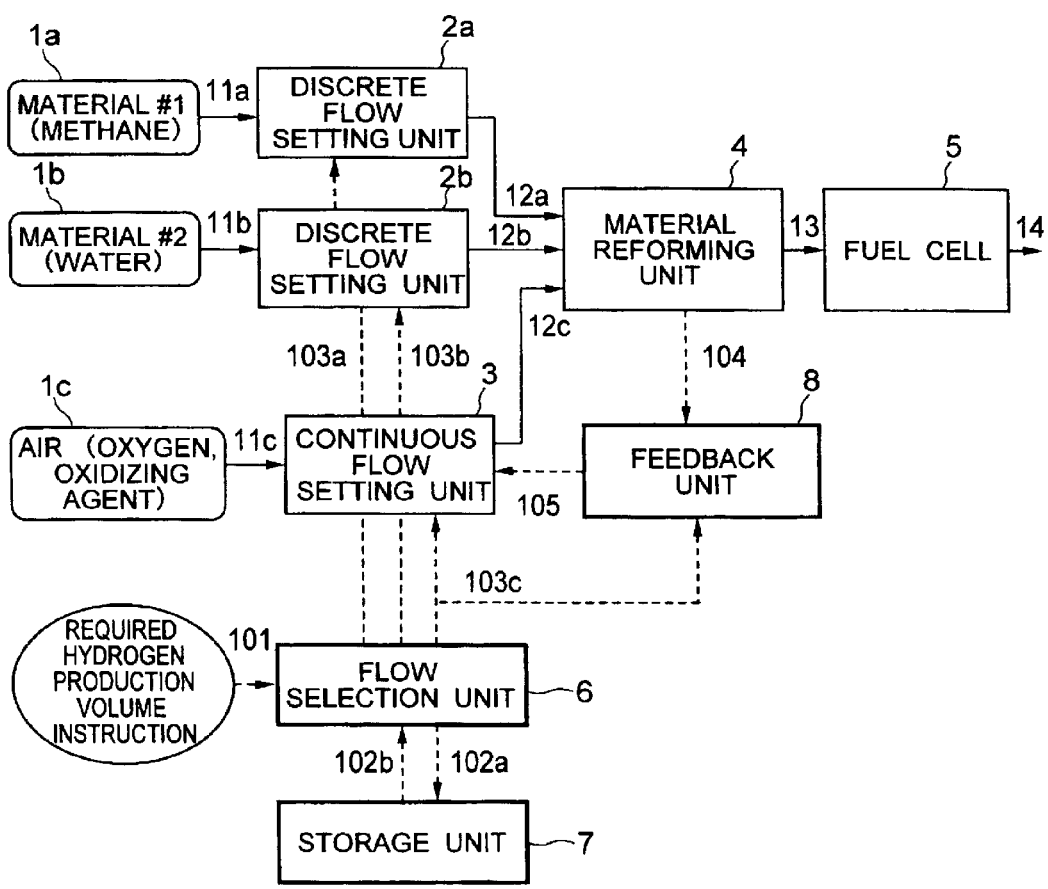
FIG. 1 is a block diagram of a hydrogen producing device in accordance with a first embodiment of the present invention, and a fuel cell power generation system employing the hydrogen producing device.

Referring now to the drawings, a description will be given in detail of preferred embodiments in accordance with the present invention, wherein like reference characters designate like or equivalent elements throughout the views.

FIG. 1 is a block diagram showing a hydrogen producing device in accordance with a first embodiment of the present invention, and a fuel cell power generation system employing the hydrogen producing device. In the drawing, reference numerals starting from "1" denote materials which are supplied to the hydrogen producing device, in which reference numeral 1c denotes air, oxygen, or an oxidizing agent capable of functioning equivalently to air or oxygen, and reference numerals 1a and 1b denote other materials. In this embodiment, the other materials include two materials. For example, the material #1 (1a) is methane and the material #2 (1b) is water.

Reference numerals 2 (2a, 2b) and 3 denote flow setting units for setting the flow (the quantity of flow) of each supplied material (1a, 1b and 1c). While explanations on concrete examples of the flow setting units will be given later one by one referring to figures, a key structural feature of this embodiment is that the flow setting units suitable for discrete flow setting are employed as the flow setting units 2a and 2b for the materials 1a and 1b, and a flow setting unit suitable for continuous flow setting is employed as the flow setting unit 3 for the material 1c.

Term "discrete" means that the flow as the target of setting is determined discretely as in, for example, the open/close of a valve. Term "continuous" means that the flow as the target of setting is determined continuously as in, for example, a control valve whose valve opening can be controlled and adjusted.

As for the flow setting unit 3, even if the continuous flow setting is impossible, the effects of the present invention are not impaired much if multilevel flow setting finer than the flow setting units 2a and b is possible. For example, if the flow setting unit 3 is capable of successively switching and setting the flow in a step-like manner in flow feedback control, such control can also be regarded as continuous flow setting although the precision of flow setting is lower.

As for the flow setting units 2a and b, it is also possible to select and use only the limited and discrete flow set values while using a continuous flow setting unit which is capable of setting the flow continuously. For example, when the supply flow of gaseous fuel such as methane is controlled by means of revolving speed control of a blower, fan, etc., the discrete flow setting can be realized by setting discretized revolving speeds. Also when the supply flow is controlled by controlling the opening of a valve, the discrete flow setting can be realized by selecting specific discrete values for the opening.

The following explanation on the embodiments will be given taking a combination of on-off valves as an example of the flow setting unit suitable for discrete flow setting, and a blower and the aforementioned control valve as examples of the flow setting unit suitable for continuous flow setting, in order to clarify the combination of the different flow setting methods.

Reference numeral 4 denotes a material reforming unit for producing hydrogen from the supplied materials by means of a specific chemical reaction. Reference numeral 5 denotes a power generation unit for generating electric power by use of hydrogen-rich gas 13 which is produced by the material reforming unit 4. Concretely, the power generation unit 5 is implemented by a fuel cell. Especially, when a polymer electrolyte fuel cell (PEFC) is employed as the fuel cell, the construction of a small-sized power generation system capable of operating at comparatively low temperature (approximately 80° C.) becomes possible.

In some types of fuel cells, specific gases (carbon monoxide, for example) have ill effects on the power generation, therefore, such gases have to be preliminarily removed or reduced. Further, sometimes it is preferable that specific ingredients such as sulfur, which is included in the supplied materials, should be removed from the supplied materials before the reforming reaction. The material reforming unit 4 also performs such gas composition adjustment.

Reference numeral 6 denotes a flow selection unit for giving flow set values to the flow setting units 2 and 3 according to an instruction value 101 concerning a required hydrogen production volume. Reference numeral 7 denotes a storage unit for previously storing the flow set values of the flow setting units 2 and 3 to be set depending on the required hydrogen production volume. Reference numeral 8 denotes a feedback unit for measuring values concerning the operation status of the material reforming unit 4 such as a representative temperature of the reforming reaction part and thereby conducting feedback control to the flow setting unit 3.

Incidentally, reference numerals 11a, 11b and 11c in FIG. 1 denote the flow of each supplied material. Reference numerals 12a, 12b and 12c denote the flow of each material which is supplied to the material reforming unit 4 after the flow setting. Reference numeral 13 denotes hydrogen-rich gas which is obtained as the result of a specific chemical reaction in the material reforming unit 4, and reference numeral 14 denotes electric power which is obtained by the power generation carried out by the power generation unit 5.

In the following, the operation of the hydrogen producing device in accordance with the first embodiment will be explained. First, the required hydrogen production volume instruction 101 is given to the hydrogen producing device. The instruction 101 is given from outside by a user, or is automatically given in an internal sequence. The instruction 101 can be, for example, numerical information designating a hydrogen production volume per unit time under the standard conditions, or can be an instruction designating the operation mode of the hydrogen producing device (such as low-load operation).

The flow selection unit 6 reads out a set of flow set values 102b from the storage unit 7 depending on the instruction 101 (102a), and outputs flow setting signals 103a, 103b and 103c to the flow setting unit 2a, 2b and 3 respectively based on the obtained information (flow set values 102b). Thereby, a preset and appropriate flow is set with regard to each supplied material, so that the materials of the appropriate flows are supplied to the material reforming unit 4.

In the material reforming unit 4, the hydrogen-rich gas 13 containing a certain amount of hydrogen corresponding to the required hydrogen production volume is produced through a specific chemical reaction, and the hydrogen-rich gas 13 is supplied to the power generation unit 5 such as a fuel cell. If the chemical reaction in the material reforming unit 4 is ideally stable, no further control is necessary. However, in practical environments, the chemical reaction sometimes becomes unstable due to unexpected internal/external factors.

As feedback control for coping with the instability, reaction temperature 104 of the specific chemical reaction is detected, and when the reaction temperature 104 deviates from a predetermined temperature or temperature range, the flow set value of the continuous flow setting unit 3 is corrected depending on the deviation (105).

In order to calculate the corrected flow set value, the feedback unit 8 shown in FIG. 1 also refers to the output 103c of the flow selection unit 6. Here, the flow setting unit 3 controls and adjusts the amount of the air (, oxygen, or oxidizing agent), which is capable of changing the reaction temperature most quickly and certainly. In order to let the result of the feedback control be correctly reflected in the flow correction, the flow setting unit 3 should be implemented by a flow setting unit suitable for continuous flow setting such as a control valve.

Meanwhile, the flow setting for the other materials is conducted with no feedback control, simply based on the required hydrogen production volume. Therefore, flow setting units suitable for discrete flow setting (such as solenoid valves), which are relatively cheap and easy to control, can be employed as the flow setting units 2a and 2b.

As above, the control according to the present invention is characterized by the combination of the temperature feedback control which is executed for the flow setting unit 3 for the air (, oxygen, or oxidizing agent) 1c, and the open-loop control in which flow setting simply based on the required hydrogen production volume 101 and which is executed for the flow setting units 2a and 2b for the other materials 1a and 1b.

Incidentally, in the embodiment shown in FIG. 1, the storage unit (memory) 7 is shown separately from the flow selection unit 6 and the feedback unit 8 for clarifying each function. However, the storage unit 7 can also be incorporated in at least one of the flow selection unit 6 and the feedback unit 8. The flow selection unit 6, the storage unit 7 and the feedback unit 8 can be integrated in one control-unit box, for example, in the form of a micro-computer-based control-unit board.

In addition, when the chemical reaction for hydrogen production is stopped, gas inside the device to which no material is being supplied is sometimes forcibly circulated continuously in order to maintain the material reforming unit 4 in a proper condition. A unit for driving such gas flow for the re-circulation can also be provided inside the material reforming unit 4, independently of the flow setting unit 2a, 2b and 3 for the material supply. It is also possible to add a bypass pipe for returning the output gas 13 of the material reforming unit 4 to the inlets of the flow setting unit, and valves for changing gas flow, and thereby carry out the re-circulation by supplying the gas to one or more of the flow setting unit 2a, 2b and 3.

Further, the instruction 101 is not limited to the required hydrogen production volume instruction itself, and may be an instruction value corresponding to another volume which correlates with the required hydrogen production volume. For example, by using an instruction value concerning the output 14 of the fuel cell 5, system configuration based on the operation of the cell can be done easily. As such an instruction value, a numeral value concerning the current, voltage or output power (wattage) of the output 14, or an the output mode of the fuel cell which indicates the low-load, middle-load or high-load can be used.

As another example, a fuel utilization ratio which indicates how much hydrogen is supplied for the ratio of hydrogen consumption necessary for obtaining a preset power generation output can also be used as the instruction 101. In general, when the fuel utilization ratio gets high, the load on the cell for generating the preset power becomes heavy. On the other hand, when the fuel utilization ratio is made low, the rate of wastefully supplied hydrogen gets higher. Therefore, when the fuel utilization ratio is used as the instruction 101, a desired fuel utilization ratio can be realized easily.

According to this embodiment, temporarily or abruptly occurring instability of reaction which is caused by internal/external factors can properly be coped with. Term "properly" means the following meanings.

If the total combination of the supplied materials is controlled in order to maintain the proper reaction temperature against the temporary or abrupt instability, the amounts of the supplied materials after the control are necessitated to be different from those for stably attaining the required hydrogen production volume when no factor causing instability exists. In consideration of response delay accompanying the reaction, such control itself might become the cause of additional external disturbance. In order to change and control the reaction against the temporary or abrupt fluctuation and thereafter let the reaction converge into the stable state after recovery from the fluctuation while avoiding the above problem, fine and minute control of the amounts of the supplied materials becomes essential. Consequently, sophisticated and intelligent hardware (flow setting unit) becomes necessary for the fine and minute flow control.

On the other hand, in the present invention, the stabilization of the reaction against the temporary or abrupt instability is attained by maintaining the reaction temperature by controlling and adjusting the amount of the supplied air (, oxygen, or oxidizing agent), while keeping the amounts of the other materials at those that are required when the reaction is stable. Therefore, faster control response against external disturbance can be obtained, and further, there is almost no danger that the control itself causes additional disturbance.

Further, as for the flow setting unit which tends to require complex structure and control, the fine and minute flow control is not required of the flow setting unit for materials other than the air (, oxygen, or oxidizing agent). Therefore, the easily controlled flow setting unit having relatively simple structure can be employed for the other materials. Consequently, the whole system can be provided at a low cost, from the viewpoints of both hardware and software.

Incidentally, the information stored in the storage unit 7 shown in FIG. 1 can be either a map in which a set of flow set values are assigned to each required hydrogen production volume, or functions for calculating flow set values based on the required hydrogen production volume. The flow selection unit 6 may use the information stored in the storage unit 7 directly, or may calculate each of the flow set values after executing some operation such as interpolation, based on various information. However, simpler setting is better for extracting and obtaining the effects of the present invention most.

Figure 2:
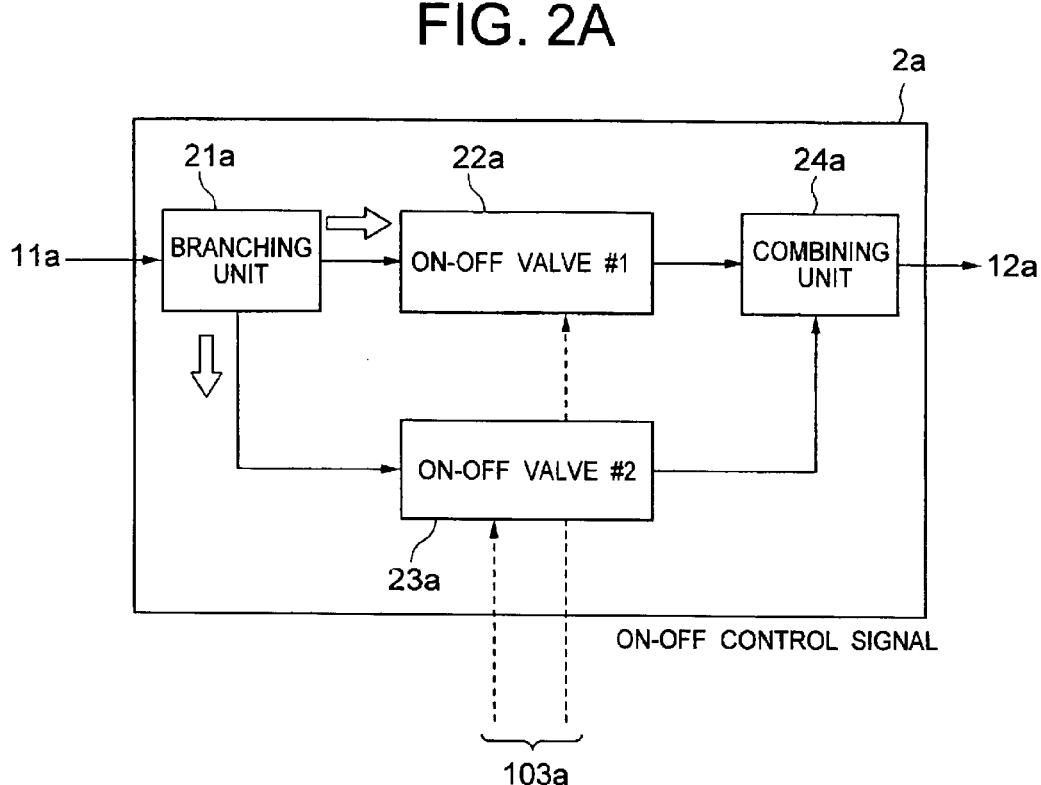
FIGS. 2A and 2B are explanatory drawings of a discrete flow setting unit in the first embodiment.

In the following, the structure of the flow setting unit and the flow setting method therefor will be explained. FIGS. 2A and 2B are explanatory drawings for explaining an example of the discrete flow setting unit in accordance with the first embodiment. In FIG. 2A, reference numeral 21a denotes a branching unit for branching the supplied material flow 11a. The branching unit 21a can be implemented by combining branching pipes each of which has desired channel resistance. The channel resistance can be given by changing the shape or dimensions of each pipe, or by providing internal channel structure in the branching unit 21a.

Reference numerals 22a and 23a denote on-off valves which can be opened and closed by being triggered with a specific signal. Although it is also possible to let control valves capable of continuously changing the flow such as globe valves or pinch valves perform on-off action, as the on-off valves 22a and 23a in this embodiment, valves designed exclusively for on-off action such as solenoid valves are preferable in order to attain simple and easy control. The on-off valves 22a and 23a are placed in parallel with respect to the input, in order to carry out the flow control explained later.

Reference numeral 24a denotes a combining unit for combining flows. The combining unit 24a can be implemented by simply joining two upstream pipes together. However, it is also possible to reduce backward material flow by joining the two pipes together after making a double pipe structure, or by employing a liquid non-return structure.

As explained above, the discrete flow setting unit 2a (2b) shown in FIG. 1 is constructed by use of the flow branching unit 21a, the flow combining unit 24a and the parallelly connected on-off valves 22a and 23a.

In the following, the operation of the flow setting unit shown in FIGS. 2A and 2B will be explained. Reference numeral 103a shown in the drawings denotes a flow setting signal which is outputted by the flow selection unit 6. The flow setting signal 103a is composed of two on-off signals for the on-off valves #1 (22a) and #2 (23a). By the combination of the two on-off signals, four levels of flows including "stop" can be set. Since any flows other than the four flow set values are not regarded as targets of flow setting, it is called "discrete flow setting unit".

By setting the branching unit 21a so that the total flow of the opened on-off valve #1 (22a) is smaller than that of the opened on-off valve #2 (23a), the relation between the valve statuses and the flow of the supplied material #1 (11a) can be set as a table shown in FIG. 2B.

When both the on-off valves #1 and #2 are closed, the supplied material flow becomes "0". The status corresponds to a case where the reaction in the material reforming unit 4 is stopped and no hydrogen is newly produced. When one of the on-off valves #1 and #2 are opened, the material is supplied with low flow and medium flow. When both the on-off valves #1 and #2 are opened, the material supply with high flow, which is approximately the sum of the low flow and the medium flow, is realized.

By appropriately setting the branching flows of the branching unit 21a so as to supply the material corresponding to the hydrogen production volume, the above four flow set values can properly be associated with the stop of hydrogen production, low-flow operation (initial operation), middle-flow operation, and high-flow operation (rated power operation), respectively.

For example, when an instruction for low-flow operation (initial operation) is supplied as the required hydrogen production volume instruction 101, the flow selection unit 6 outputs a signal 103a for opening the valve #1 and closing the valve #2 as the information from the storage unit 7. Also for the material #2 (11b) shown in FIG. 1, flow setting can be carried out in the same way according to the required hydrogen production volume instruction 101.

Incidentally, it is also possible to let the material reforming unit 4 perform self-check by use of the combination of the on-off valves #1 and #2. When the hydrogen production reaction is progressing normally, the hydrogen production volume increases at a proper rate according to the increase of the supplied material. On the other hand, when the reaction deviates from a proper state due to deterioration of catalytic agents etc., the hydrogen production volume does not increase according to the increase of the supplied material. Alternately, behavior differently from the initial or ordinary state is found.

Therefore, aged deterioration or failure of the system can be detected by monitoring the correlation between the on-off combination of the on-off valves #1 and #2 and, for example, the hydrogen production volume or the power output of the fuel cell. Further, degradation or abnormality of the system can be forecasted by obtaining the rate of the correlation to extrapolate its tendency. As a result, the operation mode of the system can be switched into "degradation mode" or "failure mode", or an appropriate alarm signal can be issued. A modification value of the supplied material necessary for the change of the operation mode can previously be stored in the storage unit 7 shown in FIG. 1.

The self-check can be executed by sampling data during the normal operation of the system, or in a predetermined diagnosis mode. The diagnosis mode can be activated when the device is started up or in the nighttime when the power load is low.

Further, the number of on-off valves is not limited to two. Finer flow control becomes possible if a larger number of on-off valves are connected in parallel and the on-off combination of the valves are controlled properly. The number of on-off combinations increases by "the power of 2", therefore, a sufficient number of combinations can be obtained by adding only a few on-off valves.

According to the discrete flow setting unit shown in FIGS. 2A and 2B in accordance with the first embodiment, the practical four-stage hydrogen production operation including "reaction stop" can be realized by the combination of only two parallelly connected on-off valves #1 and #2 which are simply structured and easily controlled, such as solenoid valves.

The proper operation of the discrete flow setting unit can be attained by the relatively simple and easy control by the on-off combination of the on-off valves. Therefore, error in the control or operation of the discrete flow setting unit hardly occurs in practical environment, thereby reliability in practical use can be improved.

Another example of the discrete flow setting unit will be explained referring to FIG. 3. The flow branching unit 21a, the on-off valves #1 and #2 (22a and 23a), and the flow combining unit 24a are the same as those of the discrete flow setting unit shown in FIGS. 2A and 2B. In the discrete flow setting unit shown in FIG. 3, flow adjustment unit #1 and #2 (25a and 26a) are provided after the on-off valves #1 and #2 (22a and 23a), respectively.

As the flow adjustment unit, a constant-flow valve or a governor can be employed for example. The constant-flow valve means a valve capable of maintaining a preset constant flow even if primary pressure (upstream flow pressure) or secondary pressure (downstream flow pressure) varied. In a known technique for maintaining a preset constant flow, a mechanism for controlling pressure difference between the primary pressure and the secondary pressure is provided inside the constant-flow valve, and the channel cross section is maintained constant under the condition that the pressure difference is constant. By providing a constant-flow valve after an on-off valve, a preset flow can be set and maintained independently of the branching flow of the flow branching unit 21a.

The governor means a device for adjusting the pressure of the flow to a preset pressure. In a known technique, a mechanism for controlling pressure loss such as a perforated plate whose channel cross section can be varied is provided inside the governor, and the pressure loss is controlled by reference to exit pressure, thereby a preset exit pressure is maintained. By providing a governor after an on-off valve, a preset pressure can be set independently of the branching flow of the flow branching unit 21a, thereby a preset flow can be set properly according to flow resistance which is peculiar to the channel.

In the following, the operation of the flow setting unit shown in FIG. 3 will be explained. As an example, the flow branching unit 21a is assumed to branch and supply the material flow evenly to the on-off valves #1 and #2 (22a and 23a). The flows of the on-off valves #1 and #2 (22a and 23a) when they are opened are set independently by use of the flow adjustment units #1 and #2 (25a and 26a). Since the flow adjustment units for exclusive use are provided to the on-off valves, the flows of the on-off valves #1 and #2 (22a and 23a) can be set more precisely. The other components are the same as those shown in FIGS. 2A and 2B.

Figure 3:
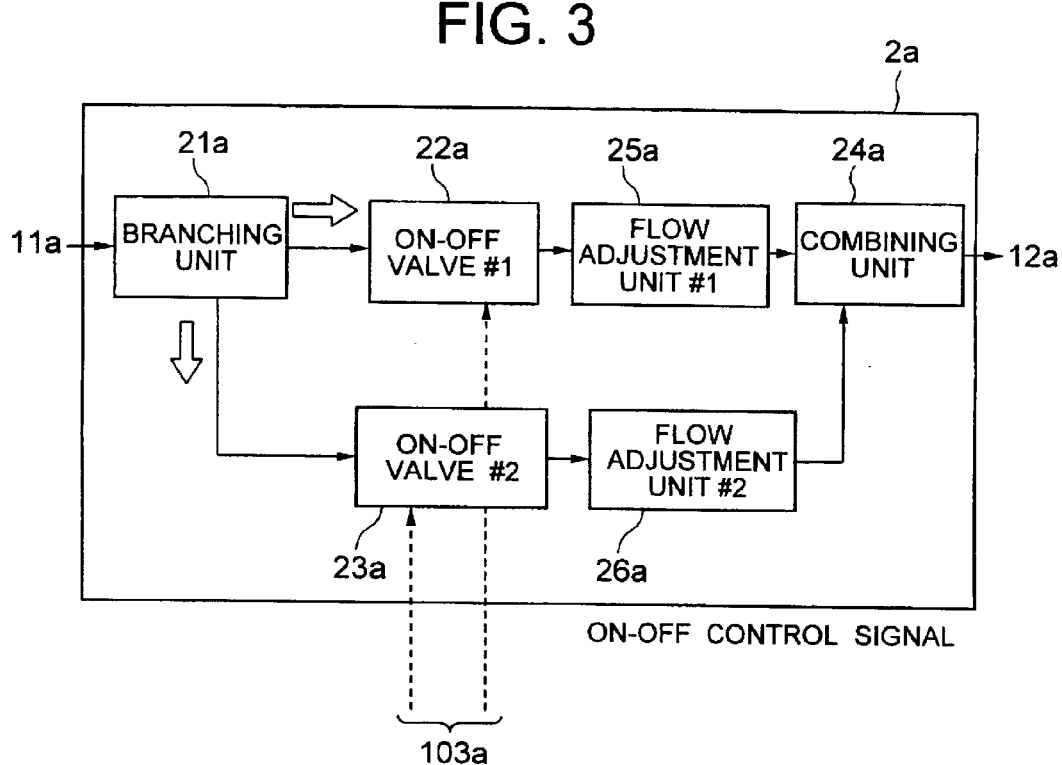
FIG. 3 is an explanatory drawing of another discrete flow setting unit in the first embodiment.

Incidentally, both the on-off valves #1 and #2 (22a and 23a) are provided with their exclusive flow adjustment units #1 and #2 (25a and 26a) in the example shown in FIG. 3. However, if precise flow setting is unnecessary, one of the on-off valves #1 and #2 can be serially provided with the flow adjustment unit. For example, when only the flow adjustment unit #1 (25a) is employed, the flow of the on-off valve #1 (22a) is determined by the flow adjustment unit #1 (25a), whereas the flow of the on-off valve #2 (23a) is determined by the branching flow of the flow branching unit 21a.

Since the discrete flow setting unit shown in FIG. 3 in accordance with the first embodiment employs the flow adjustment unit for the flow setting of each on-off valve, correct flow setting can be maintained constantly even if flow status on the upstream side (primary side) or downstream side (secondary side) of the on-off valve changed and thereby the primary pressure or secondary pressure varied, for example.

Further, the flow branching unit 21a is not required to have the flow setting function, therefore, the structure of the flow branching unit 21a can be simplified.

Figure 4:
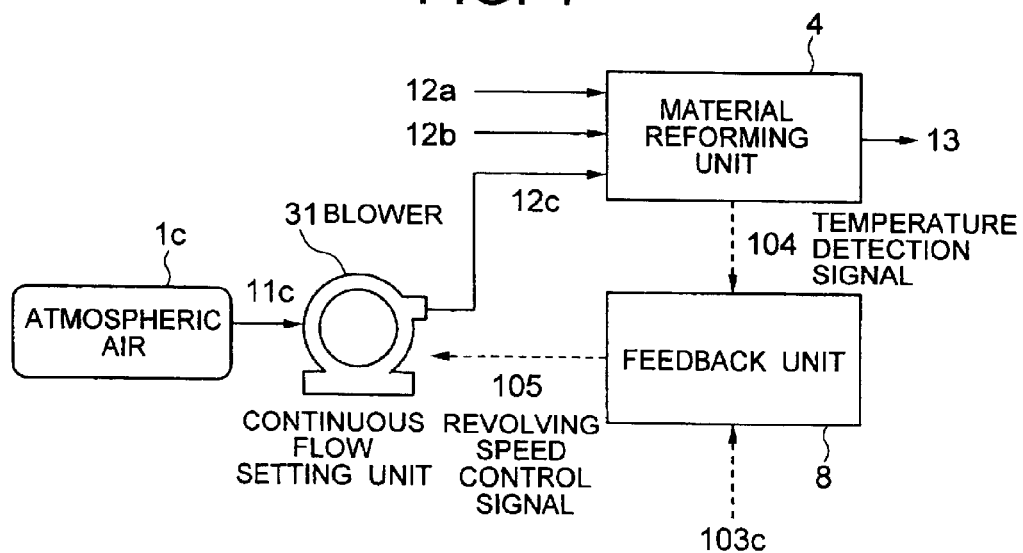
FIG. 4 is an explanatory drawing of a continuous flow setting unit in the first embodiment.

Referring to FIG. 4, an example of the continuous flow setting unit in accordance with the first embodiment will be explained. In the drawing, reference numeral 1c denotes air (, oxygen, or oxidizing agent) used for the hydrogen production reaction. Although a high-pressure gas bomb containing air or oxygen can be used as the source, FIG. 4 assumes a case where air in the atmosphere is used directly, for the simpler purpose.

Reference numeral 31 denotes a blower. For feedback control which will be explained later, the blower 31 whose revolving speed can be varied by an external control signal is used. The revolving speed of the blower 31 can be changed continuously, differently from the combination of the on-off valves (FIGS. 2A, 2B and 3). Here, a flow setting unit capable of changing its flow set value continuously is generally called a "continuous flow setting unit". The other components shown in FIG. 4 are the same as those shown in FIG. 1.

In the following, the operation of the flow setting unit shown in FIG. 4 will be explained. The blower 31 receives air supply 11c from the atmosphere to supply the air 12c to the material reforming unit 4. The amount of the supplied air has correlation with the revolving speed of the blower 31. Therefore, the amount of the supplied air is adjusted by controlling the revolving speed.

The feedback unit 8 detects the temperature 104 of the hydrogen production reaction part in the material reforming unit 4. A thermocouple or various types of temperature sensors can be employed for the temperature detection. It is also possible to detect the temperature using an electrical resistance wire of a specific length such as a platinum wire to measure the resistance change of the resistance wire.

In the temperature detection, the temperature can be detected at a representative point of the reaction, or the average temperature can be detected. If a point at the highest temperature at which oxidation progresses most is selected as the representative point, feedback control maintaining the highest temperature below a preset temperature can be carried out easier. For the detection of the average temperature, a temperature sensor of a distributed type such as the aforementioned electrical resistance wire can be used, or it is also possible to let two or more temperature sensors detect temperatures in parallel and let the feedback unit 8 calculate the average temperature. In the latter case, reference numeral 104 denotes a set of temperature signals from the temperature sensors.

The feedback unit 8 refers to air flow information 103c which has been set depending on the required hydrogen production volume. The feedback unit 8 refers to the original air flow information 103c to execute a correction process for it. In the case shown in FIG. 4, information concerning the revolving speed of the blower 31 which realizes the air flow can also be used directly as the air flow information 103c. When the detected temperature 104 deviated from a preset target temperature or temperature range, the feedback unit 8 increases or decreases the flow set value of the continuous flow setting unit 3 according to the deviation.

The increase/decreases of the flow set value is carried out by increasing/decreasing the revolving speed of the blower 31. In FIG. 4, the signal 105 for the flow correction which the feedback unit 8 outputs to the blower 31 is a revolving speed control signal after correction.

Incidentally, it is also possible to provide a filter unit for air purification in front of the blower 31 or after the blower 31. Thereby, stable operation of the system is realized even in dusty environments. A dehumidifier can be provided. Thereby, it is possible to remove water from air, so that water the amount of which is more than a preset amount is not supplied to the material reforming unit 4. It is also possible to provide a structure such as a throttling structure after the blower 31 so as to control the output flow of the blower 31.

In the continuous flow setting unit shown in FIG. 4 in accordance with the first embodiment, the amount of the supplied air (, oxygen, or oxidizing agent) can be controlled continuously by the revolving speed control of the blower 31, so that it is possible to carry out the flow correction to increase or decrease the flow a little bit. Therefore, such fine flow correction can be executed by relatively simple methods in comparison with the discrete flow setting unit (FIGS. 2A, 2B and 3). Meanwhile, there are cases where keeping a constant and designated flow by use of the blower 31 is more difficult in comparison with the discrete flow setting unit (FIGS. 2A, 2B and 3) due to turbulence etc. However, such fluctuation and variation in accuracy can be compensated for by the combination with the feedback unit 8.

Figure 5:
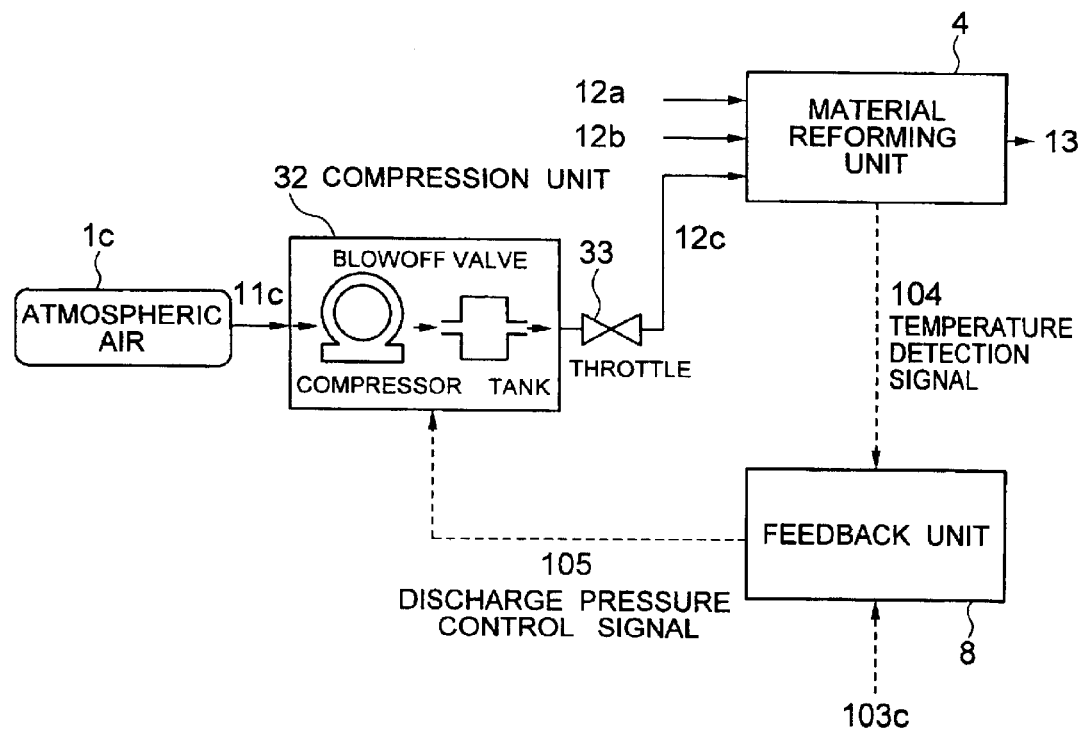
FIG. 5 is an explanatory drawing of another continuous flow setting unit in the first embodiment.

Referring to FIG. 5, another example of the continuous flow setting unit in accordance with the first embodiment will be explained. In the drawing, reference numeral 32 denotes an air compression unit for boosting air to a desired pressure. An ordinary compressor can be used as the air compression unit 32. There are various types of compressors such as a centrifugal compressor which discharges air to its peripheral part by use of centrifugal force and thereby compresses air, a rotary compressor using a screw or rotor blades, and a reciprocating compressor using a to-and-fro motion of a piston.

The control of discharge pressure can be done by controlling the opening of the inlet valve or delivery valve of the compressor, or by controlling air flow so as to decrease the air flow when the pressure rises and to increase the air flow when the pressure falls. The compressor may be provided with a tank at its rear end for holding the pressure. It is also possible to use the compressor for the purpose of increasing the air pressure to a preset pressure and thereafter adjust the supplied air pressure by reducing outlet pressure by, for example, changing the open-close cycle of a blow-off valve.

Reference numeral 33 denotes a throttle provided to a pipe after the air compression unit 32. By the provision of the throttle 33, pressure control such as boosting can be made easier for a small-sized compression unit. The other components are the same as those shown in FIG. 4.

In the following, the operation of the flow setting unit shown in FIG. 5 will be explained. Air compressed by the air compression unit 32 flows out of the throttle 33 at a preset flow rate. The outflow of air, which is determined by pressure difference between upstream pressure and downstream pressure of the throttle 33, does not vary much since the downstream pressure is opened to the reaction system.

Therefore, the downstream outflow of the throttle 33 is almost determined by the upstream pressure of the throttle 33 (that is, outlet pressure of the air compression unit 32). Thus, the supplied air flow 12c to the material reforming unit 4 can be adjusted by, for example, controlling the discharge pressure of the compressor. In the example shown in FIG. 5, the signal 105 for the flow correction which the feedback unit 8 outputs is a discharge pressure control signal for the compressor. In the case where the open-close cycle of the blow-off valve is changed for the pressure control, the signal 105 is a signal for controlling the open-close cycle of the blow-off valve. In both cases, the supplied air flow is varied by varying the upstream pressure of the throttle 33.

Incidentally, even if a relatively large variation occurred to the downstream pressure of the throttle 33, the feedback unit 8 automatically corrects the discharge pressure of the compressor, for example, so as to maintain an air flow necessary for a preset temperature. That is, no problem occurs in the feedback control unless the variation of downstream pressure exceeds compression capacity of the air compression unit 32.

According to the continuous flow setting unit shown in FIG. 5 in accordance with the first embodiment, the supply flow is controlled through pressure, therefore, pressure drift or variation occurring to a material supply line during the material supply can be suppressed naturally.

For example, if the flow control is carried out so as to maintain a preset flow, there is a possibility that in-pipe pressure gradually increases due to compressibility of the supplied fluid, exceeds permissible pressure of the flow setting unit, and causes a failure. Or, disturbance such as in-pipe temperature variation or fluctuation can cause pulsation in the in-pipe pressure and exert ill effects on the flow setting. In the method of this embodiment carrying out the flow control through pressure, such phenomena can be avoided by means of ordinary control.

Figure 6:
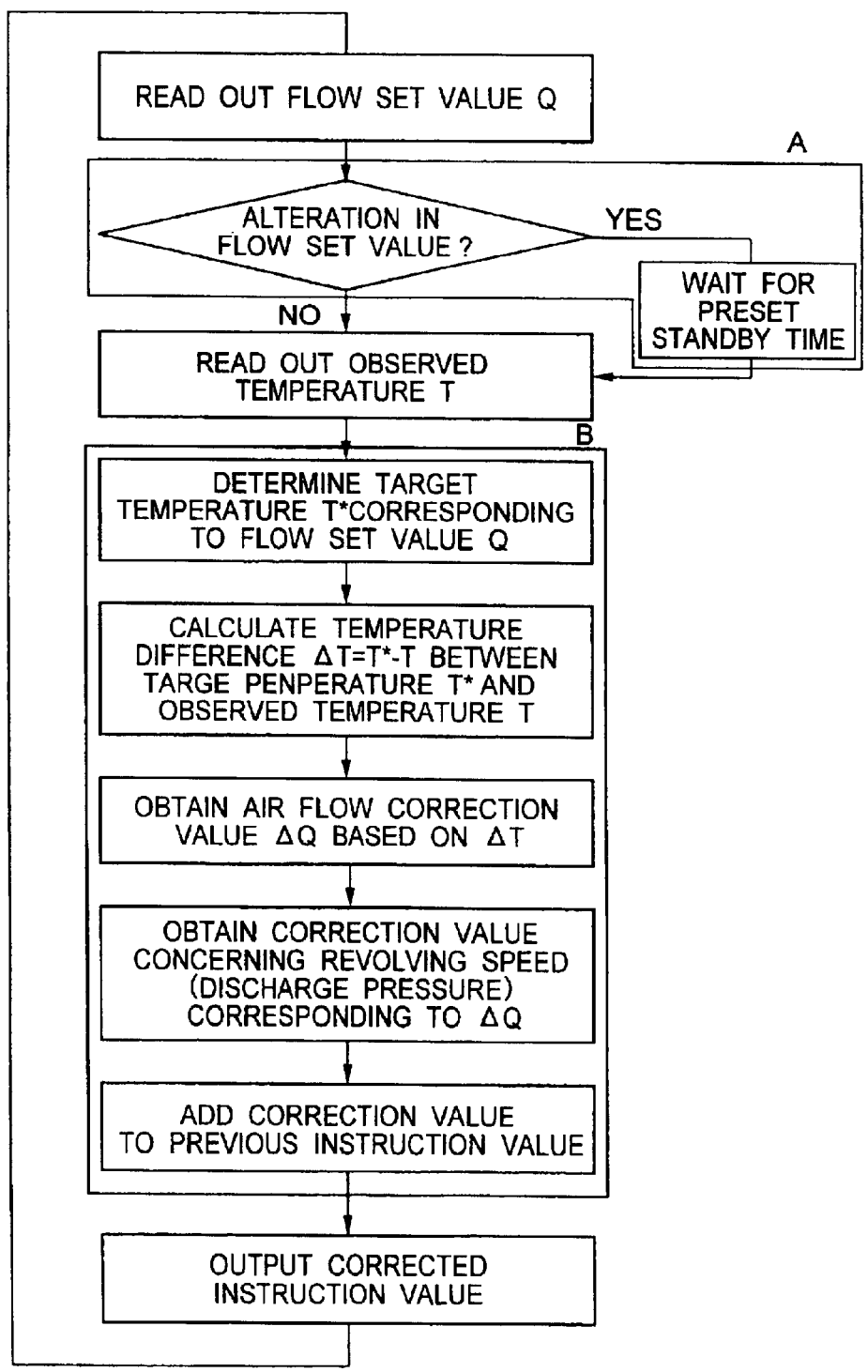
FIG. 6 is a flow chart for explaining an example of a control method of a feedback means in the first embodiment.

Referring to FIG. 6, an example of a control method of the feedback unit in accordance with the first embodiment will be explained. First, a flow set value (Q) is read out based on the flow setting signal 103c supplied from the flow selection unit 6 (FIG. 1).

Subsequently, the flow set value (Q) is compared with an initial value or a previously read flow set value to judge whether or not there is alteration in the flow set value (process "A"). If there is alteration in the flow set value, a preset standby time is waited for in consideration of time necessary for stabilization of reaction. If there is no alteration in the flow set value, it proceeds to the next process.

Subsequently, the temperature T of the material reforming unit 4 is read out as the signal 104. Thereafter, a correction value concerning the blower revolving speed, the compressor discharge pressure, etc. for the continuous flow setting unit 3 is calculated based on the flow set value (Q) and the observed temperature (T) (process "B").

The basic operation contents of the process "B" include the following steps. First, a target temperature T* of the reaction is determined depending on the flow set value (Q). The target temperature T* can be set to a constant regardless of Q, or can be calculated as a function of Q. If the target temperature T* varies in a complex manner depending on Q, an additional storage unit can be provided outside to store it.

Subsequently, a temperature difference $\Delta T = T^* - T$ between the target temperature T* and the observed temperature T is calculated. Then, a correction value $\Delta Q$ of the air flow which is necessary for compensating for the temperature difference $\Delta T$ is obtained. The correction values $\Delta Q$ are preliminarily determined for each temperature difference $\Delta T$, based on experiments with various $\Delta T$, for example. Storage of the correction values $\Delta Q$ can be done employing a function, a map, interpolation, etc. If necessary, an additional storage unit can also be used.

Subsequently, a correction value concerning the blower revolving speed, the compressor discharge pressure, etc.

corresponding to the correction value ΔQ is obtained. The correction values are preliminarily determined for each correction value ΔQ, based on experiments with various ΔQ, for example. Storage of the correction values can be done similarly to the storage of the correction values ΔQ.

At the end of the process "B", the obtained correction value is added to the value before correction, and thereby a value after correction (105) is obtained. At the end of the whole control process, the value after correction (105) is outputted to the continuous flow setting unit 3 as a new blower revolving speed, a new compressor discharge pressure, etc. Thereafter, the above control process is executed repeatedly.

The example shown in FIG. 6 has the features of the integral control (I-control) in which the correction value is calculated based on the temperature difference ΔT and the addition of the correction values is repeated. However, it is of course possible to employ other control methods as the process "B".

For example, when it has the features of the proportional control (P-control), the corrected flow set value (Q) is calculated based on the temperature difference ΔT, and thereby a value of the corresponding blower revolving speed, compressor discharge pressure, or the like is obtained as the instruction value. In this case, the successive addition of the correction values is not executed.

As an example, the correction value ΔQ for the flow set value Q can be set proportionally to the temperature difference ΔT. By this method, the correction value ΔQ (∝ΔT) is added to the flow set value Q while ΔT is not zero. However, when ΔT is zero, ΔQ also becomes zero. Thereby, the flow set value can be restored to the initial value Q of the case where there's no external perturbation or fluctuation.

When reaction fluctuation due to external perturbation etc. is small, the proportional control, which can be carried out easily, is desirable. On the other hand, when reaction fluctuation due to external perturbation exists, a steady-state deviation might occur to the supply flow value for realizing the preset temperature. In order to eliminate the steady-state deviation, the integral control is preferable. When the hydrogen production reaction is relatively stable but external perturbation can not be neglected, it is also possible to combine the P-control and the I-control.

Figure 7:
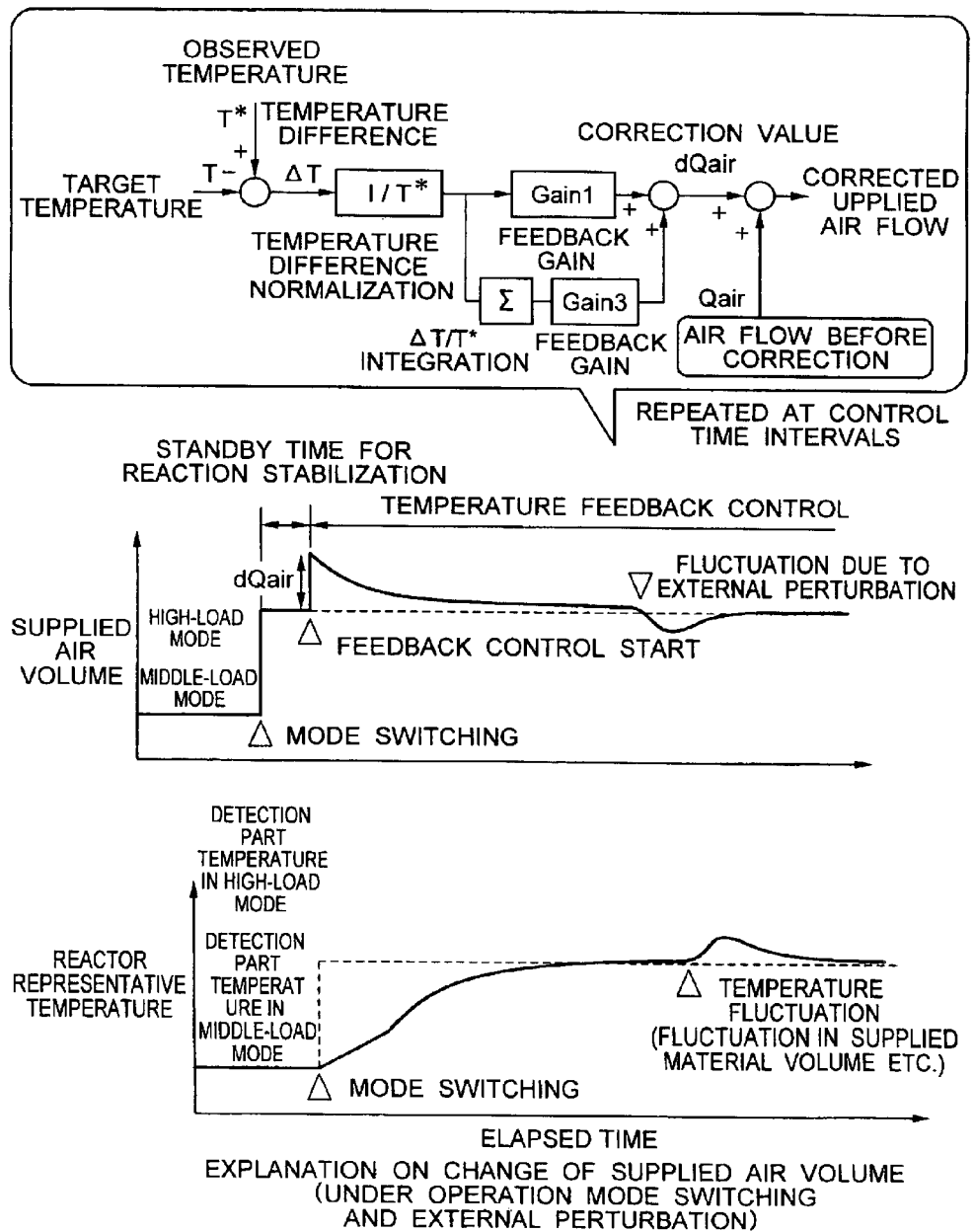
FIG. 7 is a flow chart showing an example of a feedback control method combining P-control and I-control.

In FIG. 7, an example of a feedback control flow in which the P-control and the I-control are combined is shown. Relative variations in the supplied air volume and the temperature in the case where the operation mode of the hydrogen producing device is switched according to FIG. 6 are also shown. While switching from a middle-load mode to a high-load mode is shown in the example shown in FIG. 7, the feedback control can also be applied to switching between other modes.

The supplied air volume changes in a step-like manner by the mode switching. Thereafter, feedback control is started after waiting for a certain standby time for the stabilization of reaction. At the point in time, if the representative temperature of the reactor has not reached a target temperature, the supplied air volume is corrected by dQair as shown in FIG. 7 as the effect of the feedback control. By the temporary increase of the air flow, the temperature rise is accelerated. Thereby, the time necessary for the mode switching can be shortened. Thereafter, when the representative temperature of the reactor approaches the target temperature, the correction value dQair diminishes gradually.

In the above feedback control, the temperature difference ΔT between the target temperature T*, which has previously been determined corresponding to each operation mode, and the observed temperature T (representative temperature of the reactor) is normalized with respect to the target temperature T*, and a multiplication by a feedback gain "Gain 1" which corresponds to the proportional control, and a multiplication of an integrated value by a feedback gain "Gain 2" which corresponds to the integral control are carried out in parallel, and thereafter, the correction value dQair is obtained by adding the multiplication results together. The correction value dQair is added to an air flow Qair before correction to determine the supplied air volume. The above process is repeated at preset control time intervals.

Here, even if the temperature started fluctuating due to fluctuation in the supplied material flows etc., the temperature can be restored stably by increasing/decreasing the supplied air flow so as to cancel out the fluctuation. If the reaction is relatively stable, the correction can be carried out using the proportional control and the integral control as main control and auxiliary correction control, respectively. Concretely, Gain 1>Gain 2. On the other hand, if the reactor is very unstable, it can be carried out mainly using the integral control.

In the case where the integral control is used mainly, if the deviation to be corrected by the control is too large, the change in the supplied air flow might become too large, so that the reaction might get into an unstable state. For such cases, it is also possible to set upper/lower limits to the correction value dQair and neglect variations outside the range, thereby the control can be carried out in a stable reaction range only. Such upper/lower limits can be selected previously by conducting experiments, simulations, etc. so as to reflect the characteristics of the reactor.

As another method for carrying out the control in a stable reaction range only, it is also possible to reset the supply flow at preset time intervals or each time when a predetermined temperature condition etc. is satisfied. According to this method, the ill effects due to error accumulation in the flow correction calculation can be avoided even in long-term continuous operation. In addition to the PI-control, if there's enough processing power in reserve, a general PID control or other control methods can also be employed.

Incidentally, the process "A" shown in FIG. 6 can also be omitted depending on the characteristics of the material reforming unit 4. While the flow set value (Q) and the observed temperature (T) can also be read out simultaneously at some appropriate point in time.

While the process "B" shown in FIG. 6 has been described as being composed of several individual steps in order to clarify basic contents of the control, all or part of the process "B" can also be executed at one time by, for example, preparing a function or map data to be used for obtaining and outputting a corrected value depending on the flow set value (Q) and the observed temperature (T), directly obtaining a corrected value from ΔT not via ΔQ, etc.

In addition, the observed value which is indicated by the signal 104 is not limited to the temperature of the material reforming unit 4, but can also be other information such as the output of a specific gas sensor, that characterizes the status of hydrogen production.

Further, the feedback unit 8 does not necessarily have to output the corrected value in every control cycle shown in FIG. 6. As one method, the result can also be outputted after repeating the correction operation for a preset number of times. In this case, since the correction result is outputted after being added together for the preset number of times, alteration of the flow set value can be done correctly even when small correction results are rounded down and omitted due to coarse resolution of the continuous flow setting unit. It is also possible to adjust the time interval of the flow set value outputs to the continuous flow setting unit 3 by adjusting the number of the repeated correction operations.

As another method, it is also possible to output the flow set value every preset time interval, independently of the repetition of the correction process. In this case, the result of each correction process is stored and updated in each execution of the correction process. When the set value is outputted, the result of the correction process stored at the point in time is read out and outputted, thereby the alteration of the flow can be carried out at fixed time intervals independently of time necessary for each correction process.

As a still other method, the control method of the feedback unit can be carried out in a hardware-like manner other than in the software-like manner described above. As an example, the valve opening of the air supply system can be controlled by use of deformation of a material that changes its shape depending on temperature, such as a bimetal. In other words, by letting the air supply channel be opened/closed according to the rise/fall of the temperature, the feedback control can be carried out by the flow correction using hardware so as to reduce the temperature variation.

According to the control method shown in FIG. 6 in accordance with the first embodiment, the feedback control can be carried out with relatively simple operations since the control method basically employs the control based on the difference between the observed value and the target value. Further, since the control method features the integral control in which the correction value is added up successively, steady-state deviation can be avoided after temporary or abrupt fluctuations. Therefore, the original control value can be regained stably.

The flow set values of the discrete flow setting unit in accordance with the present invention are set to the optimum values regardless of the presence or absence of fluctuations, and the flow set value of the continuous flow setting unit can stably be restored to the original control value after temporary or abrupt fluctuation by means of the above control method. Therefore, by the combination of the discrete flow setting unit and the continuous flow setting unit, instability of the reaction occurring temporarily or abruptly due to internal/external factors can be coped with properly and correctly.

Incidentally, while the control method for attaining and maintaining the preset target temperature has been explained in the example shown in FIG. 6, it is also possible to give a certain width to the target temperature. That is, the control method can also be carried out so as to maintain the reaction temperature within a preset temperature range.

Figure 8:
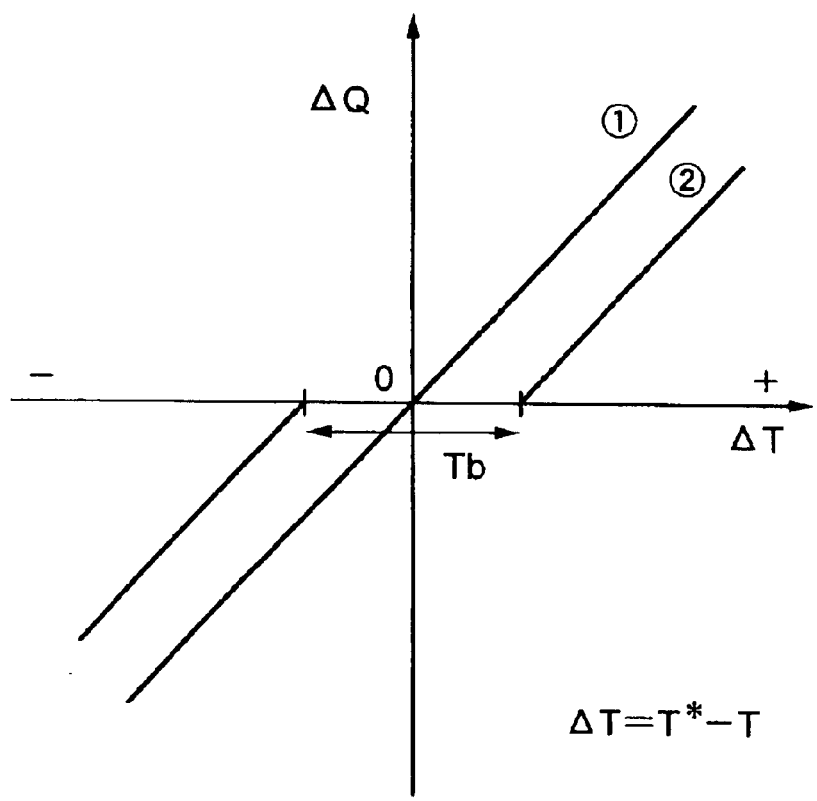
FIG. 8 is a graph for explaining a method for calculating correction values ΔQ when control is carried out so as to maintain reaction temperature within a preset temperature range.

Referring to FIG. 8, a method for calculating $\Delta Q$ in the case where the control is carried out so as to maintain the reaction temperature within a preset temperature range will be explained. In the drawing, straight line ① corresponds to the control method explained referring to FIG. 6.

According to straight line ①, when the temperature difference ($\Delta T = T^* - T$) between the target temperature $T^*$ and the observed temperature $T$ is positive ($\Delta T > 0$), the air flow is increased ($\Delta Q > 0$) so as to raise the temperature. Thereby, the oxidation reaction in the material reforming unit 4 is accelerated. On the other hand, when the temperature difference $\Delta T$ is decreased ($\Delta T < 0$), the air flow is decreased ($\Delta Q < 0$) so as to lower the temperature. Thereby, the oxidation reaction is decelerated. The relationship of line ① is of course not necessarily required to be linear.

Meanwhile, in the case of polygonal line ②, $\Delta Q$ is set to "0" and no correction is executed in a preset temperature range $T_b$. For the positive or negative temperature difference $\Delta T$ out of the temperature range $T_b$, $\Delta Q$ is increased or decreased to control the temperature similarly to the case of line ①. When temperature fluctuation easily occurs at a part as the target of temperature control, fine and minute control becomes necessary in order to attain and maintain the preset target temperature precisely. Further, the temperature control might become difficult when there's a serious delay in the reaction. However, by giving the target temperature a certain width, the difficulty in the control is relieved, so that stable control can be realized with a relatively simple method.

According to the control method shown in FIG. 8 in accordance with the first embodiment, the temperature control can be carried out giving a certain width to the preset target temperature. Thereby, stable temperature control can be carried out for an exothermic reaction part etc. where the temperature easily becomes unstable.

An example of the material reforming unit and the power generation unit in accordance with the first embodiment will be explained referring to FIG. 9. In the drawing, reference numeral 41 denotes a pretreatment unit for conducting the pretreatment of materials necessary for the hydrogen production. For mixing water, which is supplied in a state of liquid, with methane and air which are supplied in states of gas, the water can be sprayed directly into the high-temperature reaction environment, however, the mixing sometimes gets easier by previously vaporizing the water. In some cases, the catalytic oxidation reaction of methane is accelerated by preheating and rising the temperature of the methane. The pretreatment unit 41 adjusts the statuses of such materials if necessary.

When methane containing a sulfuric compound as odorant, air containing a high concentration of car exhaust gas, etc. are used as the materials, it is preferable that the sulfur content in the odorant or the exhaust gas should be removed by the pretreatment unit 41. Therefore, the pretreatment unit 41 performs desulfurization of the supplied materials by maintaining a desulfurizing catalyst in a reactive state, for example. Although not shown in FIG. 8, the vaporization of a liquid material, the preheating of a material, the desulfurization of methane containing odorant, and the desulfurization of air containing exhaust gas can be carried out separately and independent in the pretreatment unit 41. Components for conducting such processes are put together in the pretreatment unit 41.

Reference numeral 42 denotes a reforming unit which causes a specific chemical reaction by use of the pretreated supplied materials to produce hydrogen-rich gas. When methane, water and oxygen are used as the materials, the aforementioned specific chemical reaction includes two reactions: a steam reforming reaction shown in Formula (1) and an oxidation reaction shown in Formula (2).

Although the steam reforming reaction (Formula (1)) is a reaction for generating hydrogen from methane, it is an endothermic reaction. Therefore, the steam reforming reaction requires another exothermic reaction or heating from outside. The oxidation reaction (Formula (2)) is an exothermic reaction using methane as a material, and can be used as a heat source for maintaining the reaction temperature. The concentration of hydrogen produced by the reaction varies depending on equilibrium gas composition of the reaction. The equilibrium gas composition varies depending on temperature. High reaction temperature is desirable for obtaining high hydrogen concentration.

$$CH_4 + H_2O \rightarrow 3H_2 + CO - 205 \text{ kJ/mol} \quad (1)$$

$$CH_4 + 2O_2 \rightarrow CO_2 + 2H_2O + 802 \text{ kJ/mol} \quad (2)$$

The reaction temperature in the case where methane, water and air are used as the materials should be set at 600° C.–800° C., for example. The heat of reaction shown in Formulas (1) and (2) changes depending on conditions such as the reaction temperature. Standard values are shown in the Formulas. It is the same in the following formulas.

The oxidation reaction progresses faster than the steam reforming reaction. Therefore, by controlling the amount of the supplied air (, oxygen, or oxidizing agent), the oxidation reaction can be controlled quickly, and consequently, the heating value can be controlled.

In the combined reforming method (autothermal reforming method), the two reactions are thermally balanced with each other and the temperature necessary for the reactions is maintained autonomously, therefore, the aforementioned temperature control is especially important. The two reactions are not necessarily required to progress at the same place. There are cases where interaction between the reactions can properly be reduced and each reaction can be carried out stably by positionally separating the two reactions from each other.

For example, it is possible to let the methane oxidation reaction generate heat at the front part of reaction (the upstream side in the material flow) and let the heat be transferred to the rear part of reaction (the downstream side in the material flow) so as to cause a specific endothermic reaction. The heat transfer includes convection heat transfer by mass transfer, and conduction heat transfer through the catalytic agent. For improving the efficiency of the heat transfer, the exothermic reaction part and the endothermic reaction part can be placed adjacent to each other via a wall having high heat transfer efficiency such as a metal wall. Incidentally, the reactions of Formulas (1) and (2) are representative reaction paths, and thus actual reactions may include other reactions.

Reference numeral 43 denotes a post-treatment unit for reducing or removing harmful gas, which is harmful to the operation of the system, from gas that is inevitably generated as the result of the specific chemical reaction. For example, carbon monoxide generated in the specific chemical reaction sometimes deteriorates an electrode catalyst of the power generation unit 5 such as a fuel cell. Therefore, the concentration of the carbon monoxide is reduced by use of an equilibrium reaction (shift reaction) shown in Formula (3), or the carbon monoxide is removed by adding air (, oxygen, or oxidizing agent) again and causing oxidation reaction. Each of such reactions can be caused by a catalytic reaction in practical use.

Low Temperature (approx. 200° C.)

$$CO + H_2O \leftrightharpoons CO_2 + H_2 \quad (3)$$

High Temperature

In each of the pretreatment unit 41, the reforming unit 42 and the post-treatment unit 43, a catalytic agent suitable for each specific reaction is installed. For example, in the reforming unit 42, noble metal catalysts such as platinum-based catalysts and palladium-based catalysts can be used for the exothermic reaction by oxidation, and nickel-based catalysts can be used for the endothermic reaction by steam reforming. In the post-treatment unit 43, copper-zinc-based catalysts can be used for the reduction or removal of carbon monoxide. For the use of such catalysts, the catalysts can be formed in the shape of pellets by kneading, or can be held in pellets, or can be applied on a honeycomb or metal plate.

Reference numeral 44 denotes a thermal-control unit for transferring heat among the parts of the material reforming unit 4 and improving thermal efficiency. Reference numeral 15 denotes dump hydrogen from the power generation unit 5 or off gas including the dump hydrogen, which is supplied as a heat source of the thermal-control unit 44. Reference numeral 16 denotes materials or thermal energy which is supplied from outside and is also used as a heat source of the thermal-control unit 44.

The materials or thermal energy 16 supplied from outside can be new fuel for a burner such as methane for combustion only, water vapor supplied from outside or inside the system for recovering and outputting heat by use of a heat exchanger, or electric energy for driving an easily controlled electric heater. They can be changed depending on the type of the thermal-control unit 44.

As the thermal-control unit 44, a burner, a heat exchanger, an electric heater, etc. can be used. Metallic materials having high thermal conductivity or heat pipes can also be employed for equalizing the heat of reaction. Of course, it is also possible to combine the above various types.

The material reforming unit 4 is constructed by combining the pretreatment unit 41, the reforming unit 42, the post-treatment unit 43 and the thermal-control unit 44. Especially, by the provision of the thermal-control unit 44 capable of controlling the components of the material reforming unit 4 transversely, temperature control for each component is made easier and thermal efficiency is improved.

Reference numeral 51 denotes a DC-to-AC conversion unit for converting the electrical output 14 generated by the power generation unit 5 from a direct current into an alternating current. An inverter can be used as the DC-to-AC conversion unit 51. Reference numeral 17 denotes the alternating output obtained by the DC-to-AC conversion, and 52 denotes an electric power storage unit. A lithium-based secondary cell etc. capable of storing and discharging electricity can be used as the electric power storage unit 52. Reference numeral 18 denotes dump electric power from the power generation unit 5.

Figure 9:
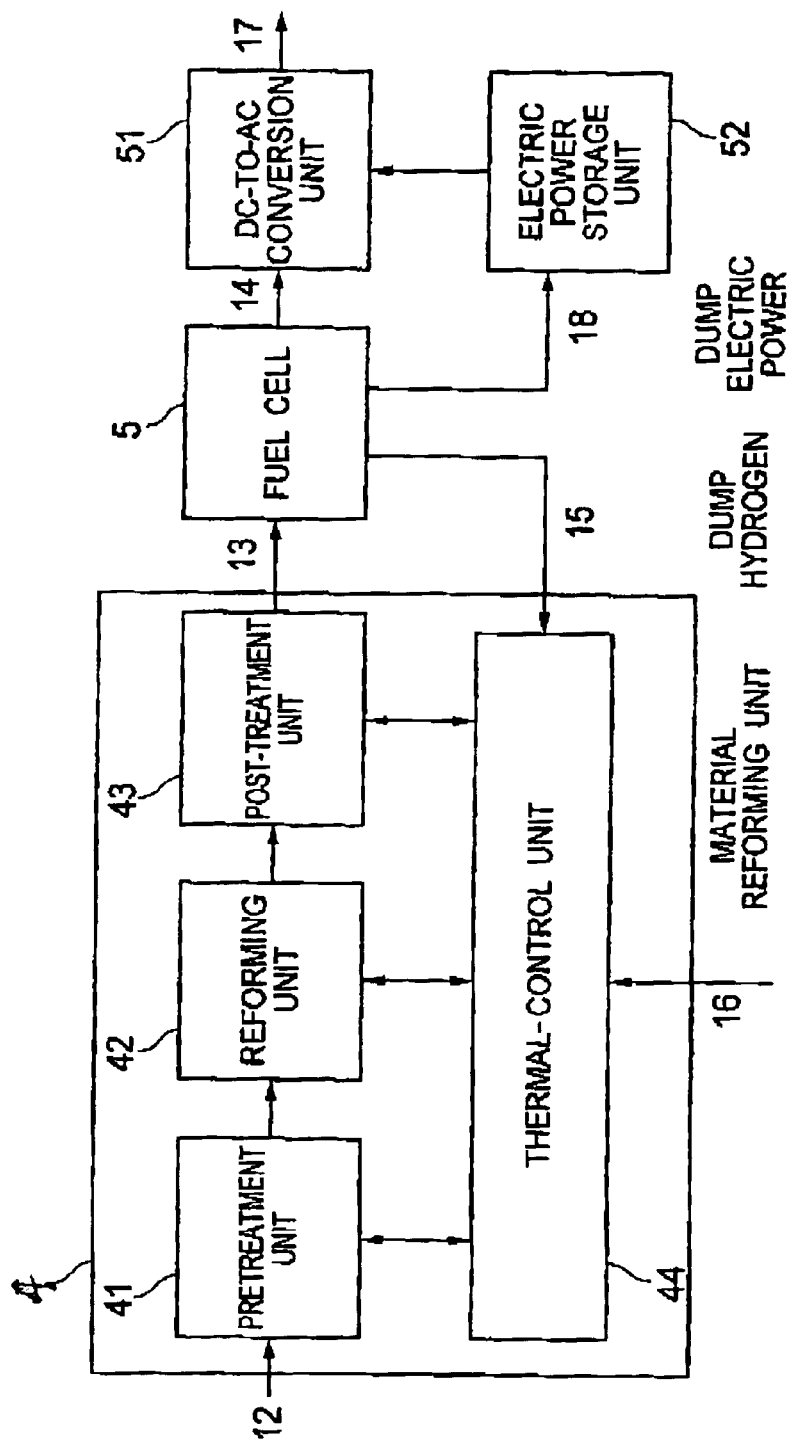
FIG. 9 is an explanatory drawing of a material reforming unit and a power generation unit in the first embodiment.

While no means or position for the temperature detection is specified in FIG. 9, the aforementioned thermocouple or various temperature sensors are provided, for example, in the vicinity of the exothermic reaction part of the reforming unit 42.

In the following, the operation of the material reforming unit and the power generation unit in accordance with the first embodiment will be explained. The materials 12 supplied to the material reforming unit 4 are first pretreated by the pretreatment unit 41. In the pretreatment unit 41, vaporization of liquid material is conducted if necessary, preheating of material is conducted if necessary for accelerating the methane oxidation reaction etc., and pretreatment such as desulfurization is conducted if harmful elements have to be removed.

Subsequently, the materials are reformed by the reforming unit 42 into hydrogen-rich gas by use of a specific chemical reaction such as the reactions represented by Formulas (1) and (2). Thereafter, harmful gas such as carbon monoxide that is harmful to the system is reduced or removed by the post-treatment unit 43 by use of catalytic reactions.

Meanwhile, the thermal-control unit 44 supplies with heat necessary for the reactions of the pretreatment unit 41, the reforming unit 42 and the post-treatment unit 43, or auxiliary heat, and carries out the heat recovery and heat redistribution if necessary. For example, the thermal-control unit 44 supplies auxiliary heat to the endothermic reaction part of the reforming unit 42, recovers a part of heat emitted from the exothermic reaction part, and thereby prevents local temperature rise. Thereby, the local temperature rise is prevented, so that a desired reaction temperature profile is obtained.

The output gas 13 from the material reforming unit 4 is supplied to the power generation unit 5 such as a fuel cell. The output 14 of the power generation unit 5 is converted by the DC-to-AC conversion unit 51 into an alternating form which is generally easy to use, and is outputted as the electrical output 17. If there is dump electric power 18 (an excess of electric power) as a result of the power generation, the dump electric power 18 is stored in the electric power storage unit 52. The electric power stored in the electric power storage unit 52 is outputted and used when the power generation unit 5 is started up, when the demand for electric power rapidly increased, etc.

While the combination of methane, water and air has been shown as the supplied materials in the first embodiment, the supplied materials can be altered depending on a hydrogen production method employed by the material reforming unit 4. For example, when methanol, water and oxygen are used as the supplied materials, the specific chemical reaction employed by the reforming unit 42 includes a steam reforming reaction (endothermic reaction) shown in Formula (4) and a partial oxidation reaction (exothermic reaction) shown in Formula (5).

$$CH_3OH + H_2O \rightarrow 3H_2 + CO_2 - 61 \text{ kJ/mol} \qquad (4)$$

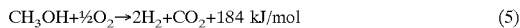

$$CH_3OH + \tfrac{1}{2}O_2 \rightarrow 2H_2 + CO_2 + 184 \text{ kJ/mol} \qquad (5)$$

According to the combined reforming method (autothermal reforming method) which balances the two reactions, temperature necessary for the reactions can be maintained autonomously.

In this case, if an aqueous solution (water solution) of methanol of a specific concentration is directly used as the materials other than the air (, oxygen, or oxidizing agent), the supply of liquid materials can be equalized and thus it is desirable for the reaction. The methanol water solution can be produced by mixing methanol and water, which are supplied in preset flows, together when the methanol water solution becomes necessary in the material reforming unit 4, or it is also possible to prepare a methanol water solution of a specific concentration and to store the solution previously. In the latter case, adaptation to various hydrogen production conditions becomes difficult since the mixture ratio between methanol and water can not be changed. However, one of the material supply lines can be omitted, so that the construction of the device can be simplified.

Incidentally, in reaction statuses where oxidation reaction for generating heat is weak, the thermal-control unit 44 can be used as an auxiliary heat source. The thermal-control unit 44 is capable of supplying necessary heat to the reforming unit 42 in order to support the temperature control being carried out by means of the flow correction of the air (, oxygen, or oxidizing agent).

In this case, the feedback control for the flow of the air (, oxygen, or oxidizing agent) which has been explained referring to FIG. 1 is only required adjustment or control of the amount of heat that can not be afforded by the heat supply. In this heat supply, it is also possible to change the supply amount of heat by referring to the signal 103c from the flow selection unit 6 and the signal 105 from the feedback unit 8.

According to the material reforming unit and the power generation unit shown in FIG. 9 in accordance with the first embodiment, both hardware and software necessary for the material supply system can be simplified while correctly maintaining desired reaction temperature, thereby a low-cost fuel cell power generation system can be provided.

This fuel cell power generation system is applicable to a distributed power source for home use; a distributed industrial power source for a hotel, a convenience store, etc.; a car-mounted power source; a portable power source to be used in disaster situations; etc., depending on power generation performance of the system. Since costs can be cut down while maintaining necessary features for practical use, a wide propagation of the technique is expected.

By combining the discrete flow setting unit explained referring to FIGS. 2A, 2B and 3, the continuous flow setting unit explained referring to FIGS. 4 and 5, the control method for the feedback unit explained referring to FIGS. 6, 7 and 8, and the material reforming unit and the power generation unit explained referring to FIG. 9, the first embodiment of the present invention can be operated efficiently. Thereby, device cost reduction in the material supply system and maintenance/stabilization of the hydrogen production accuracy can both be attained.

Figure 10A:
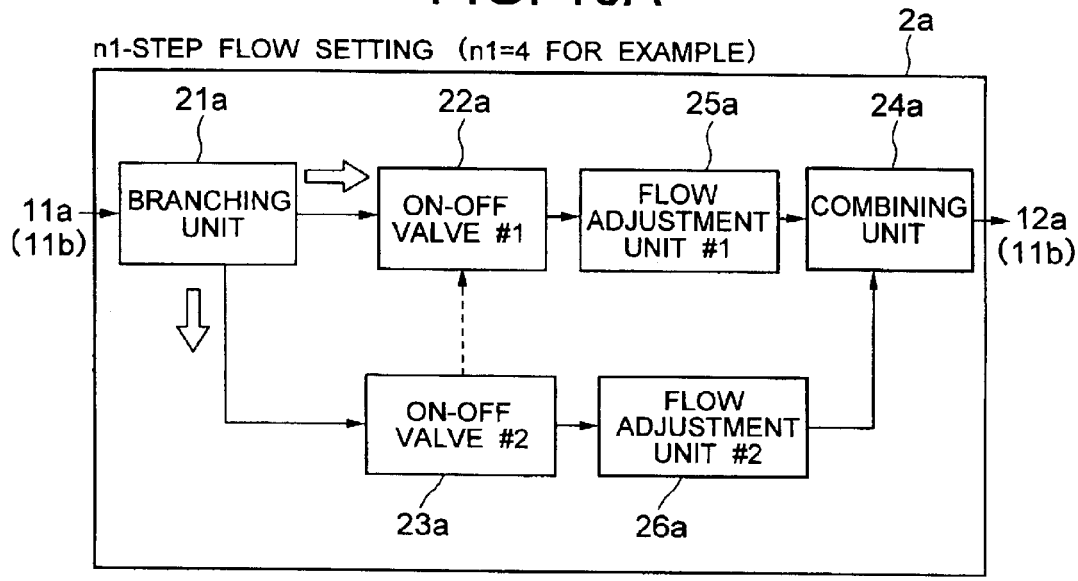
FIGS. 10A and 10B are explanatory drawings of a flow setting unit in a second embodiment of the present invention.
Figure 10B:
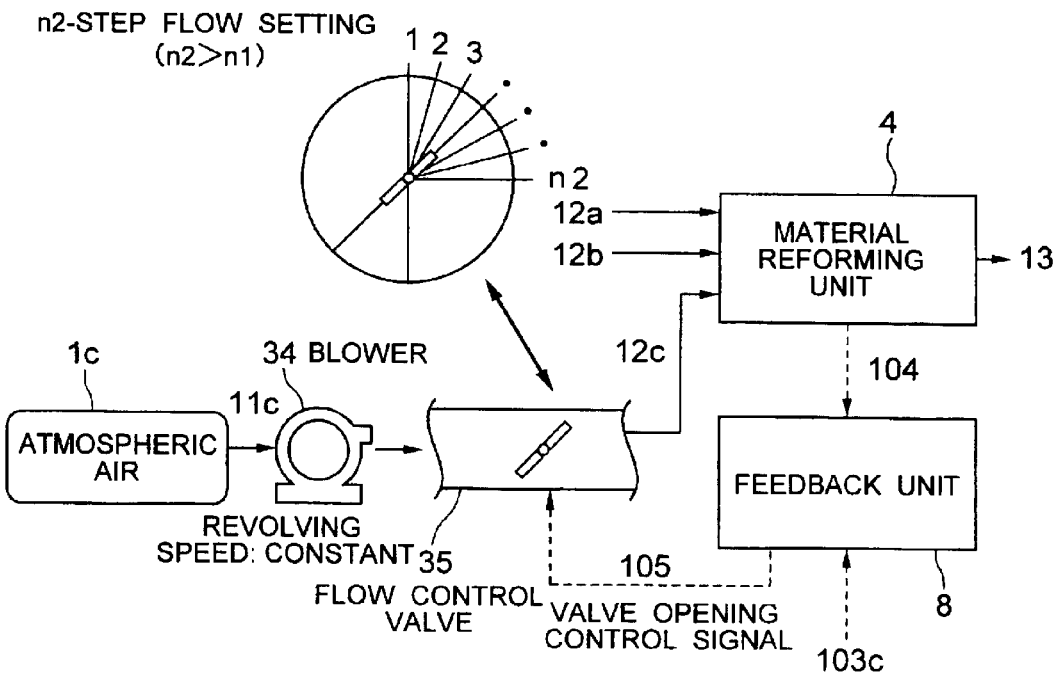

In the following, a second embodiment of the present invention will be described. FIGS. 10A and 10B are explanatory drawings of a hydrogen producing device in accordance with the second embodiment. FIG. 10A shows a discrete flow setting unit capable of executing n1-step flow setting. The discrete flow setting unit employs the same structure as that shown in FIG. 3, that is, a case where n1=4 is shown.

FIG. 10B shows a continuous flow setting unit capable of setting the flow in at least n2 levels. In the drawing, reference numeral 34 denotes a blower used under a constant revolving speed. The blower 34 supplies atmospheric air 1c to the following stages. Reference numeral 35 denotes a flow control valve, in which the opening angle of a butterfly valve can be controlled, for example. The flow control valve 35 is placed after the constant-revolving-speed blower 34 and executes the multilevel flow control.

Such structure combining a blower and a valve in series is not necessarily new as cited in JP-A-11-317234. However, in this embodiment, the flow control valve 35 is provided in order to carry out the multiple-level flow setting instead of the aforementioned continuous control such as the continuous blower revolving speed control.

In the second embodiment, the signal 105 for flow correction is a signal for controlling the valve opening of the flow control valve 35. It is assumed that the opening of the flow control valve 35 is controlled in n2 steps, as mentioned above. The other components are the same as those shown in FIGS. 1–9.

In the following, the operation of the hydrogen producing device in accordance with the second embodiment will be explained. It is similar to the example in accordance with the first embodiment shown in FIG. 3 in that an n1-step discrete flow setting unit, especially, the flow setting unit in which two on-off valves are placed in parallel is used for each supplied material other than the air (, oxygen, or oxidizing agent).

The second embodiment is characterized by the flow setting unit for the air (, oxygen, or oxidizing agent) whose flow setting is discretized into n2 steps. The flow of the supplied air (, oxygen, or oxidizing agent) is varied and controlled by switching the flow set value among the n2 steps.

For the flow correction control by the feedback unit 8 for the air (, oxygen, or oxidizing agent), it is preferable that n2 should be set at least larger than n1. If the condition n2>n1 is not satisfied, the precision of the feedback flow correction becomes the same as the original precision by flow switching, thereby proper correction against temporary or abrupt temperature fluctuation etc. becomes difficult.

If n2 is set as n2=n1 for example, the number of the steps of the air (, oxygen, or oxidizing agent) supply volume becomes as small as the number of steps of the operation mode switching. Therefore, the air supply volume can not be increased over an air supply volume necessary for an operation mode in which the air (, oxygen, or oxidizing agent) supply volume becomes maximum. In other words, if the temperature dropped due to external perturbation in the operation mode, the temperature can not be regained by increasing the air (, oxygen, or oxidizing agent) supply volume. By setting n2 as n2=n1+1 so that the air supply volume can be increased over the air supply volume necessary for the operation mode in which the air (, oxygen, or oxidizing agent) supply volume becomes maximum, the above problem can be resolved.

Of course, if the influence of the temperature variation in the operation mode is very small because of remarkable stability of the target hydrogen producing device in the high-temperature range, ill effects of the setting n2=n1 are small. The number of the steps of the air (oxygen, or oxidizing agent) supply volume can be varied depending on the characteristics and required precision of the reactor. However, the condition n2>n1 can be regarded as a proper condition for ordinary hydrogen producing devices.

Incidentally, when the temperature has to be dropped in the above operation mode and if we assume that n1=4, the air (, oxygen, or oxidizing agent) supply volume may be temporarily reduced by switching to another air supply volume for a lower operation mode which requires one or more steps smaller air supply volume. Such control corresponds to a case where the continuous flow setting is approximately applied.

The flow setting for the air (, oxygen, or oxidizing agent) is executed as follows. The blower 34 maintains a constant revolving speed and supplies an almost constant amount of air (, oxygen, or oxidizing agent) to the flow control valve 35. The flow control valve 35 controls the flow by varying the butterfly valve opening. That is, when the valve opening is changed from the valve opening "1" shown in the drawing to the valve opening "n2", the flow can be changed from approximately zero to a maximum flow (full throttle).

The flow changes in a step-like manner due to the step-like valve opening control. While valve opening increment between each adjacent two steps are set constant in the example of FIG. 10B for the sake of simple explanation, it is also possible to actually measure the relationship between the valve opening and real flow to determine a proper opening angle for each step. Thereby, influence of pressure variation at upstream side of the control valve can be absorbed, for example.

When the supply of the air (, oxygen, or oxidizing agent) is stopped, it is desirable that the revolving speed of the blower 34 should be set to zero. A leak in the stopping state easily occurs in the butterfly valve, however, the supply of air 11c can be reduced to zero almost perfectly by closing the valve (setting to position "1" shown in FIG. 10B) along with setting the revolving speed of the blower 34 to zero.

In FIGS. 10A and 10B, it is shown the case where the opening angle of the continuously controlled valve is discretely set. However, it is also possible to employ a valve in which the valve opening inherently changes only in the step-like manner, or an open/close mechanism that implements the step-like change.

In addition, the flow control valve employing the butterfly valve can also be replaced with other means. For example, when a pinch valve or a needle valve is used, the n2-step discrete flow setting is realized by changing effective channel cross section of the valve. When a governor is used, the n2-step discrete flow setting can be realized by changing the reference pressure for the pressure control of the governor, or by changing effective channel cross section of an internal decompression unit.

According to the second embodiment described above, the flow setting of the air (, oxygen, or oxidizing agent) which requires the feedback control is discretized into n2 steps, thereby flow setting by use of a digital control unit such as a microcomputer can be made simpler and easier. Digitization generally enables the construction of a high-performance system at a low cost.

The precision of the feedback control explained in the first embodiment is not impaired much by setting the number n2 at least larger than or preferably, sufficiently larger than the flow setting step number n1 of the discrete flow setting unit (n1=4 in the practical example).

Figure 11:
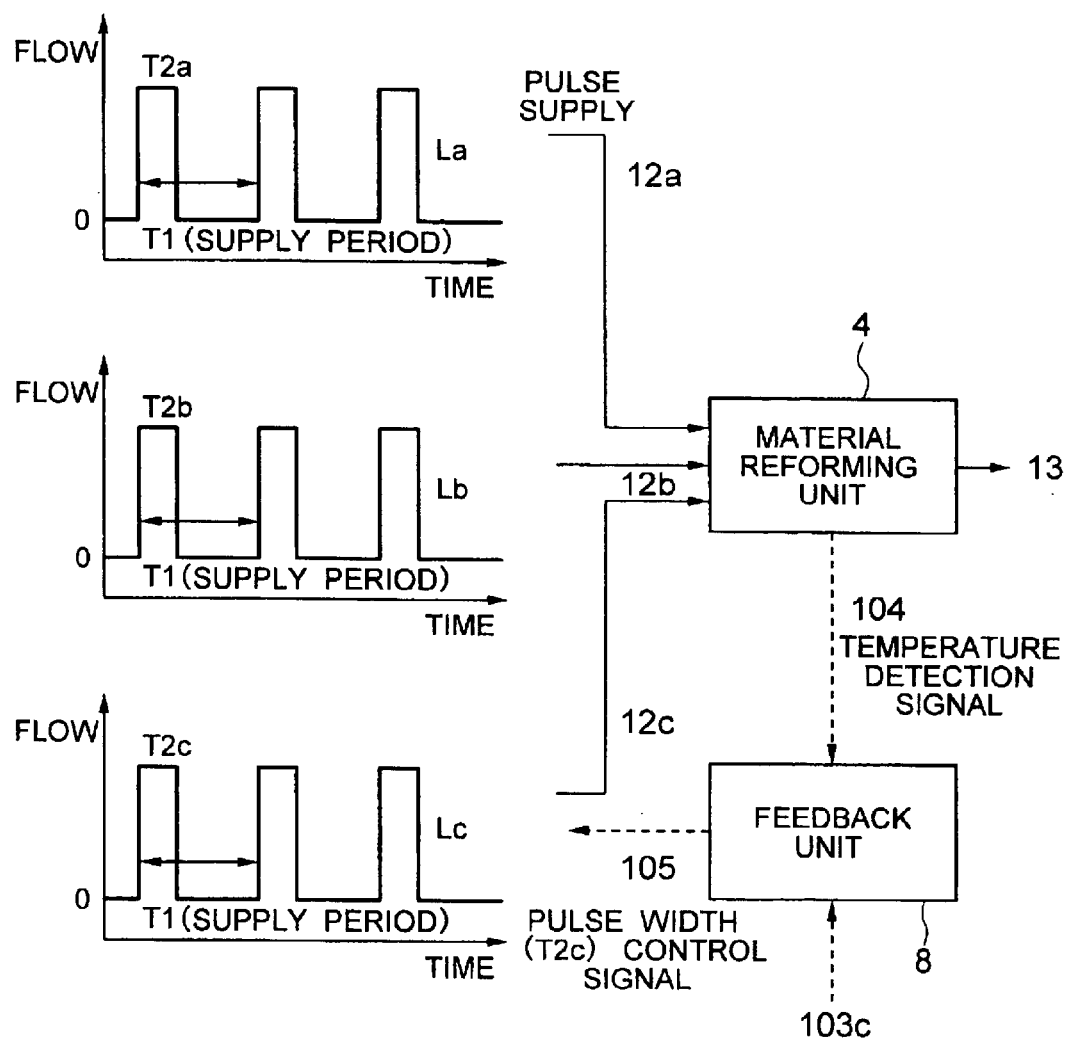
FIG. 11 is an explanatory drawing of a flow setting unit in a third embodiment of the present invention.

FIG. 11 is an explanatory drawing of a hydrogen producing device in accordance with a third embodiment of the present invention. The third embodiment is characterized in that each of the supplied materials 12a, 12b and 12c is supplied in pulse-like patterns. That is, each material is supplied for time T2a, T2b or T2c every supply period T1.

In FIG. 11, the signal 105 for the flow correction outputted by the feedback unit 8 is a signal for controlling the flow pulse width T2c concerning the supply of the air (, oxygen, or oxidizing agent). The other composition is the same as that shown in FIG. 1.

In the following, the operation of the hydrogen producing device in accordance with the third embodiment will be explained. The pulse-like material supply is realized by, for example, controlling on-off time of an on-off valve. As an example, on-off valves are provided to the supply lines for the air (, oxygen, or oxidizing agent) and other materials, and the supply lines are opened by the on-off valves for time T2a, T2b and T2c every supply period T1, respectively.

The heights of the pulses (flow set values) are set so that average flows of the supplied materials during time T1 matches with a set of set values given by the flow selection unit 6 (FIG. 1). When the set values are changed due to alteration of the required hydrogen production volume, the pulse widths T2a, T2b and T2c are changed without changing the pulse heights. Therefore, it is not necessary to combine two or more on-off valves, and only the on-off time of the on-off valve may be controlled. Especially, for the pulse width T2c for the supply of the air (, oxygen, or oxidizing agent), the on-off time can be changed continuously according to the signal 105, thereby the temperature correction control can be carried out similarly to the first embodiment.

Incidentally, if the supply period T1 can be shortened enough, switching control that is substantially the same as the continuous supply control can be realized. However, in consideration of mechanical properties or the operating life of the on-off valve, the supply period T1 can not be shortened like that in some cases. In such cases, pulsation or fluctuation might occur in the amount of the output gas from the material reforming unit 4. However, such pulsation or fluctuation can be absorbed and reduced by providing a hydrogen storage unit (buffer tank) after the material reforming unit 4, as will be explained later in an embodiment shown in FIG. 13.

In addition, while the common supply period T1 is set for all the supplied materials and pulse phases for the materials are synchronized in FIG. 11, they can also be varied for each material. By the adjustment of the pulse phases, the supply timing for each material can be adjusted so as to realize optimum mixing of the materials for the reaction. Of course, efficiency of the reaction deteriorates if the supply timing for each material is shifted too much.

Furthermore, it is also possible to simultaneously change the flow of each on-off valve in addition to the change of on-off time of each on-off valve. Such control corresponds to the change of both the pulse width and the pulse height. Such control can be implemented by, for example, controlling the on-off time of each of the on-off valves connected in parallel. Thereby, finer flow control becomes possible.

According to the third embodiment explained above, the flow setting/correction can be carried out only by changing the on-off time of the on-off valve such as a solenoid valve, which is provided to each supply system, without the need of combining the on-off valves as a discrete flow setting unit or providing an additional continuous flow setting unit. Therefore, it has a significant effect with regard to the simplification of hardware.

Figure 12A:
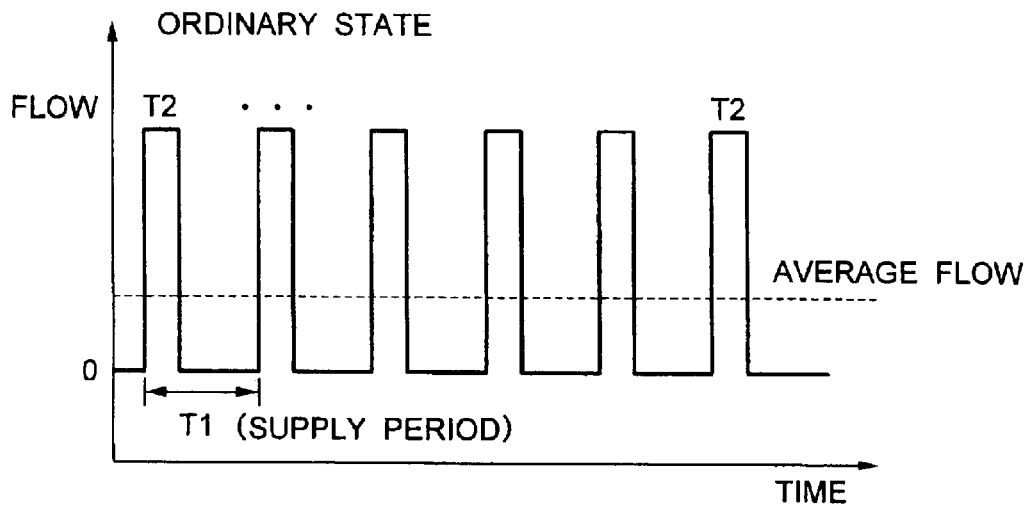
FIGS. 12A and 12B are explanatory drawings for explaining a supplied material flow control method in the third embodiment.
Figure 12B:
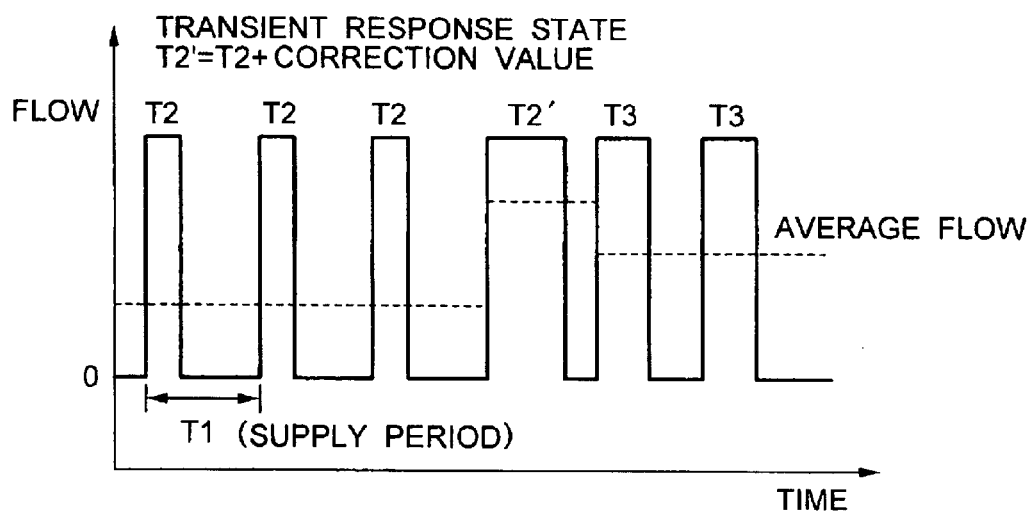

Referring to FIGS. 12A and 12B, another control method for the hydrogen producing device in accordance with the third embodiment will be explained. In FIG. 12A, an ordinary material-supply state is shown. In the ordinary material-supply state, a preset average flow is set by use of the material supply period T1 and the flow pulse width T2.

In FIG. 12B, the pulse width correction conducted in a transient response state is shown. For example, when the hydrogen production volume is increased, the pulse width is increased from T2 to T3 in order to increase the supplied material volume according to the output of the flow selection unit 6.

The flow is temporarily increased up to T2' (>T3) in response to the change of the required hydrogen production volume. Thereby, fast convergence to the target hydrogen production volume is realized. On the other hand, when the flow is decreased, T2' is temporarily set smaller than T3.

The correction values for calculating T2' can previously be stored in the storage unit 7 (FIG. 1) depending on the pulse widths before and after the pulse width alteration. In the case shown in FIGS. 12A and 12B, the correction value can be obtained based on the original pulse width T2 and the pulse width T3 after the alteration. The series of processes for altering the pulse width according to the required hydrogen production volume alteration instruction can be carried out by the flow selection unit 6.

Incidentally, while the correction process shown in FIGS. 12A and 12B is conducted for only one supply period, the correction can also be done for two or more supply periods. It is also possible to change the correction value minutely during the two or more supply periods. The number of supply periods for executing the correction can previously be stored in the storage unit 7. The settings for the alteration can be carried out by the flow selection unit 6.

In addition, the correction value can also be varied depending on the supply period T1. It is also possible to change a plurality of supply periods T1 previously stored to the storage unit 7. Furthermore, the transient material supply method shown in FIGS. 12A and 12B can be applied not only to air (, oxygen, or oxidizing agent) but also to the other materials.

According to the control method shown in FIGS. 12A and 12B in accordance with the third embodiment, the material-supply time is controlled depending on the alteration of the required hydrogen production volume. Thereby, the transient response and the compliance with the alteration of the required hydrogen production volume can be improved.

Referring to FIG. 13, an example of a material reforming unit and a power generation unit in accordance with a fourth embodiment of the present invention will be explained. In the drawing, reference numeral 4a and 4b both denote material reforming units. The material reforming units are discriminated by reference characters "#1" and "#2". The number of the material reforming units can be more than two, however, two material reforming units are shown in FIG. 13 as representatives.

Reference numeral 9 denotes a hydrogen storage unit (buffer tank). The hydrogen storage unit 9 is a container in which hydrogen-rich gas is packed. The hydrogen storage unit 9 can be formed by simply spreading the capacity of a pipe, connecting a tank to a pipe in series, etc. It is also possible to add a compressor and an on-off valve to the tank for the temporary storage of the output gas. As for the storage of the output gas, gas inflow/outflow to/from the hydrogen storage unit 9 can be controlled by monitoring the internal pressure of the hydrogen storage unit (buffer tank) 9 or monitoring the load on the power generation unit 5. It is important that the hydrogen storage unit 9 is capable of functioning as a passive or active lowpass filter for the flow.

Reference numeral 91 denotes an auxiliary hydrogen supply unit for the hydrogen storage unit 9. For hydrogen storage by the hydrogen supply unit 91, hydrogen storage materials such as hydrogen storage alloy or carbon nanotubes can be used. When such hydrogen storage materials are used, a unit for outputting and inputting hydrogen such as a heating unit for releasing hydrogen stored in the carbon nanotubes is provided as part of the hydrogen supply unit 91. The hydrogen supply unit 91 itself can be the hydrogen producing device.

Reference numeral 92 denotes a hydrogen selection unit for purifying dump hydrogen which is outputted from the power generation unit 5 after the power generation. For example, palladium-based membranes are known to be selectively permeable by hydrogen. The other components are the same as those shown in FIG. 9.

In the following, the operation of the material reforming unit and the power generation unit in accordance with the fourth embodiment will be explained. First, at least one of the material reforming units 4a and 4b receives supplied materials 121 and 122 to produce hydrogen-rich gas.

The plurality of material reforming units can be controlled their operation separately or in the same way. In the former case, it is possible to let one of the material reforming units perform the base load operation constantly and let a necessary number of other material reforming units start operating when the required hydrogen production volume increases. By such control, the operation of the hydrogen producing device minimizing waste can be realized while widening the dynamic range of the hydrogen production volume. In the latter case, the amounts of the supplied materials 121 and 122 are controlled in the same way. Thereby, the control can be executed easier while widening the dynamic range of the hydrogen production volume.

The hydrogen-rich gas is first led to the hydrogen storage unit (buffer tank) 9 before being supplied to the power generation unit 5 such as a fuel cell. The hydrogen supply unit 91 supplies hydrogen in an auxiliary manner when failure occurred to the material reforming unit 4a or 4b, when the hydrogen production volume is too short, when the hydrogen producing device is started up, etc.

When a tank structure is employed for the hydrogen storage unit (buffer tank) 9, the tank structure itself functions as a passive lowpass filter for the flow. When gas inflow/outflow is controlled by feedback control as explained above, the tank structure also functions as an active lowpass filter for canceling out flow pulsation. In short, by the provision of the hydrogen storage unit (buffer tank) 9, the effect of flow pulsation can be reduced even when the pulsation occurred in the gas flow. The hydrogen supply unit 91 is an auxiliary means and thus can be omitted if unnecessary.

The power generation unit 5 such as a fuel cell receives the hydrogen-rich gas 13 from the hydrogen storage unit 9 to perform the power generation. Generally, off-gas after power generation contains residual hydrogen, therefore, the off-gas is returned to the hydrogen storage unit 9 through the hydrogen selection unit 92. By use of the hydrogen selection unit 92, gas containing a high concentration of hydrogen can be returned to the hydrogen storage unit 9. The off-gas can of course be used for other purposes, therefore, the reflux of the off-gas to the hydrogen storage unit 9 can also be omitted. The electrical output obtained as the result of the power generation is converted similarly to the case shown in FIG. 9 to be used.

Incidentally, it is also possible to provide the hydrogen storage unit (buffer tank) 9 in parallel with the output gas flow of the material reforming t units 4a and 4b. By connecting a boosting unit such as a compressor, an on-off valve, a buffer tank, and an outlet on-off valve to the parallel piping section one by one, the increase of the hydrogen storage capacity can be attained without disturbing the main stream of output gas.

It is also possible to further provide 4 hydrogen storage materials such as hydrogen storage alloy or carbon nanotubes inside the buffer tank, and add a unit (heating unit, for example) for outputting/inputting hydrogen from/to the hydrogen storage materials.

The on-off control of the inlet/outlet on-off valves of the parallel piping section can be executed effectively by, for example, monitoring the load on the power generation unit 5, releasing hydrogen when the load increased, and storing hydrogen when the load is stable and low. The pulsation reduction effect for the output gas from the material reforming unit is not impaired if a structure functioning as a lowpass filter for the flow such as an in-pipe space or a tank is provided in the main stream of the output gas.

According to the fourth embodiment, time variability of the amount of the output gas from the material reforming unit can be absorbed and relieved by the provision of the hydrogen storage unit (buffer tank) 9 between the material reforming unit 4 and the power generation unit 5.

For instance, there are cases where the amount of hydrogen produced by the hydrogen producing device in accordance with the third embodiment (FIGS. 11, 12A and 12B) pulsates due to the pulse-like material supply. However, the pulsation can be reduced by providing the hydrogen storage unit (buffer tank) 9 after the material reforming unit 4 of the hydrogen producing device. Consequently, the power generation by the power generation unit 5 can be carried out with stability.

Further, in the case where a plurality of material reforming units are provided, temporary variation might occur in the amount of gas produced by each material reforming unit. However, these variations can be absorbed and reduced by the hydrogen storage unit (buffer tank) 9. Therefore, the construction of a system including a combination of the plurality of material reforming units becomes easier.

Figure 14:
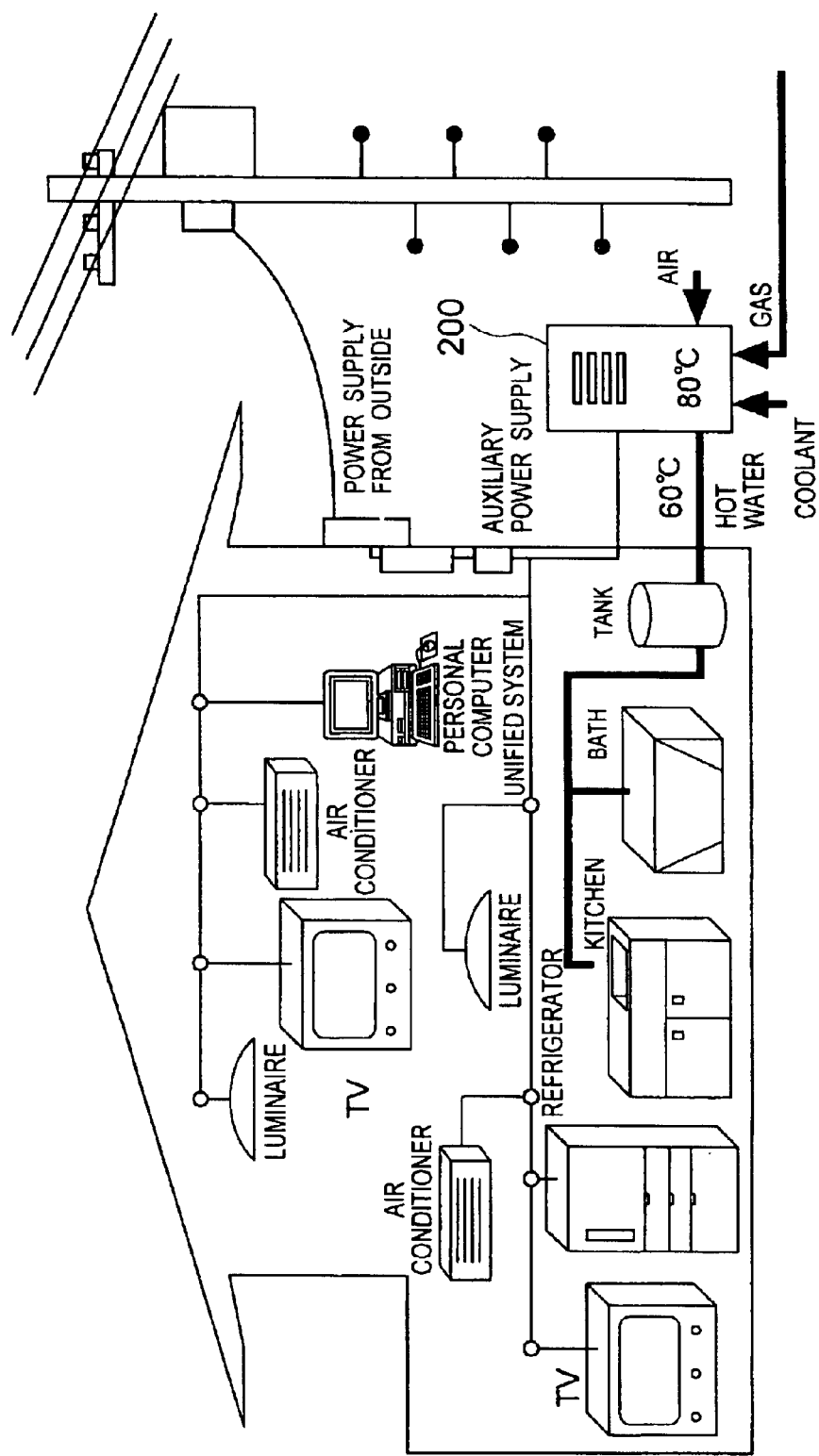
FIG. 14 is an explanatory drawing showing an example of a home-use distributed power source employing the hydrogen producing device and the fuel cell power generation system in accordance with the present invention.

In FIG. 14, an example in a case where the hydrogen producing device in accordance with the present invention and the electric power generation system employing the hydrogen producing device are applied to a stationary distributed power source installed in a house is shown.

In FIG. 14, reference numeral 200 denotes a stationary distributed power source, which includes a hydrogen producing device and a fuel cell as an electric power generation system in accordance with the present invention. The hydrogen producing device produces hydrogen using gas and air which are supplied from outside, and pure water which is generated as a result of the fuel cell power generation, as raw materials. As the gas as the raw material, natural gas containing methane as the main component can be used, for example.

The use of a fuel cell for a power generation system has a strong point other than power generation in that hot water heated by exhaust heat of the fuel cell can be obtained and used. In the case of a polymer electrolyte fuel cell, the temperature during power generation becomes approximately 80° C., and thus the temperature in the cell is controlled by use of coolant etc. By recovering the excess heat due to internal resistance of the cell etc. by cooling, the hot water is obtained.

However, if water supplied from outside is directly used for cooling the fuel cell, there are cases where impurities in the water exert ill effects on the fuel cell. In such cases, the heating of the water supplied from outside can be done indirectly by use of a unit having a heat exchange function. The temperature of the heated water reaches approximately 60° C., therefore, by storing the hot water in a tank, hot water for the kitchen, bath or washroom can be supplied from the tank without the need of a water heater or water boiler.

Further, electric power obtained by the power generation can be used together with commercial power supplied from outside for driving a variety of household electrical appliances, thereby the electric energy supplied from outside can be saved. Of course, if the fuel cell has enough power generating capacity, all the necessary electric energy can be covered without the need of the commercial power.

When the heating of water is insufficient due to cold water supplied from outside or when the temperature of hot water in the tank tends to drop, a heating unit may be provided to the inlet/outlet of the tank. The heating unit heats the hot water by burning part of material gas supplied from outside. If feedback control detecting temperature is also employed, the temperature of the supplied hot water can be raised and maintained properly by controlling heating value, flow velocity of the hot water, etc.

In cases where the electric power generated by the fuel cell fluctuates, an auxiliary electric power storage unit may be added to the fuel cell. A secondary cell capable of storing and discharging electricity can be used as the electric power storage unit.

Compactness is one of conditions required of the distributed power source for home use. In the hydrogen producing device in accordance with the present invention, the feedback control is carried out for air only among all the supplied materials. Therefore, the composition of the device naturally gets simpler in comparison with cases where feedback control is carried out for all the materials. Thereby, the size of the whole device can easily be reduced.

In addition, for spreading the distributed power sources to households, the price has to be reasonable. The hydrogen producing device in accordance with the present invention does not need sophisticated hardware as the flow control unit, and thus cost can be reduced mainly in the material supply systems.

Further, device reliability is important for the distributed power source to be used in households. The hydrogen producing device in accordance with the present invention does not need complicated control in the supply flow control, and the operation of the hardware can be made simple. Thereby, the failure rate of the whole system can be lowered. Of course, such features are much effective not only for the home-use distributed power sources but also for the realization and widespread use of the small-sized hydrogen producing devices and the electric power generation systems generating power using hydrogen produced by the hydrogen producing devices as fuel.

According to the hydrogen producing device in accordance with the present invention and the electric power generation system employing the hydrogen producing device, it is possible to provide the electric power generation systems suitable for the establishment and maintenance of a public system constructed by rapid and short-term spread of a large number of electric power generation systems, such as distributed power sources expected to be used for households, buildings, portable/emergency use in disaster situations, etc.

According to the present invention, the amount of each supplied material is set by selecting one from two or more set values which have previously been determined corresponding to the required hydrogen production volumes, and the amount of supplied air (, oxygen, or oxidizing agent) (hereafter, referred to as the "air") is varied and controlled so that the temperature of the reaction part will be within a preset temperature range. Therefore, stabilization of the chemical reaction against instability occurring in various practical environments can be attained, while avoiding the danger of causing additional external disturbance by the control itself.

For the flow setting for materials other than the air, fine and minute flow control is not required, and thus the flow setting units that has the simple structure and are easy to control can be employed. Thereby, the whole system can be provided at a low cost.

The amount of each supplied material is set by the on-off combination of two or more valves each of which is capable of providing a preset flow, and the amount of the air is set by controlling at least one selected from the opening of a valve, the supply pressure of the air and the discharge of a blower so that the temperature of the reaction part will be within a preset temperature range. Therefore, the probability of error in the control or operation in practical environments becomes low, thereby high reliability in practical use can be attained.

The amount of each supplied material is set by selecting one from n1 set values which have previously been determined corresponding to the required hydrogen production volumes, and the amount of the air is set by selecting one from predetermined n2 (n2>n1) set values. Therefore, flow setting by use of the digital control unit such as a microcomputer can be carried out easily.

Each of the supply systems for the air and the materials is provided with the flow setting unit, and at least one of the flow setting units opens the supply system during the predetermined time T2 in each predetermined time T1 and the average supply flow in the time T1 will be a desired value. The flow setting can be carried out only by changing the on-off time of the valve, therefore the hardware can be simplified much.

In the fuel cell electric power generation system employing the hydrogen producing device in accordance with the present invention as an internal source of hydrogen, control needing relatively sophisticated hardware is limited to the flow control of the air only. Therefore, the fuel cell electric power generation systems capable of reducing cost mainly in their material supply systems while realizing practical stability of temperature control can be presented.

In addition, by providing the hydrogen storage unit (buffer tank) after the outlet of the hydrogen producing device in accordance with the present invention, the pulsation of the output gas volume caused by the hydrogen producing device and the fluctuation of the output gas volume when two or more hydrogen producing devices are combined can be absorbed and reduced by the hydrogen storage unit (buffer tank).

It will be further understood by those skilled in the art that the foregoing description has been made on embodiments of the invention and that various changes and modifications may be made in the invention without departing from the spirit of the invention and scope of the appended claims.

What is claimed is:

1. A hydrogen producing device for supplying at least one type of material to a reaction part together with air, oxygen, or an oxidizing agent to produce hydrogen by a specific chemical reaction, wherein:

for the at least one type of material, supply amount of each material is set by on/off combination of two or more valves each of which is capable of providing a preset flow; and for the air, oxygen, or oxidizing agent, supply amount of the air, oxygen, or oxidizing agent is set by controlling opening of a variable-flow valve so that temperature of the reaction part is within a preset temperature range.

2. A hydrogen producing device for supplying at least one type of material to a reaction part together with air, oxygen, or an oxidizing agent to produce hydrogen by a specific chemical reaction, wherein:

for the at least one type of material, supply amount of each material is set by on/off combination of two or more valves each of which is capable of providing a preset flow; and for the air, oxygen, or oxidizing agent, supply amount is set by controlling a supply pressure of the air, oxygen, or oxidizing agent so that temperature of the reaction part is within a preset temperature range.

3. A hydrogen producing device for supplying at least one type of material to a reaction part together with air, oxygen, or an oxidizing agent to produce, hydrogen by a specific chemical reaction, wherein:

for the at least one type of material, supply amount of each material is set by on-off combination of two or more valves each of which is capable of providing a preset flow; and for the air, oxygen, or oxidizing agent, supply amount of the air, oxygen, or oxidizing agent is set by controlling discharge of a discharge-controllable blower so that temperature of the reaction part is within a preset temperature range.

4. A hydrogen producing device for supplying at least one type of material to a reaction part together with air, oxygen, or an oxidizing agent to produce hydrogen by a specific chemical reaction, wherein:

each of supply systems for the air, oxygen, or oxidizing agent and the at least one type of material is provided with flow setting means; and flow setting is performed so that at least one of the flow setting means opens a supply system corresponding thereto during a second time period in a preset first time period and an average supply flow in the first time period becomes a desired value.

5. A hydrogen producing device as claimed in any one of claims 1–3 and 4, wherein the at least one type of material includes two types of materials which are water and methane.

6. A hydrogen producing device as claimed in any one of claims 1–3 and 4, wherein the at least one type of material includes two types of materials which are water and methanol.

7. A hydrogen producing device as claimed in any one of claims 1–3 and 4, wherein the at least one type of material includes one type of material which is an aqueous solution of methanol.

8. A hydrogen producing device as claimed in any one of claims 1–3 and 4, wherein the hydrogen producing device produces the hydrogen by a combined reforming method in which a combination of an exothermic reaction and an endothermic reaction is employed.

9. A hydrogen producing device as claimed in claim 4, wherein the second time period is varied depending on status of hydrogen production operation such as alteration of a required hydrogen production volume.

10. A hydrogen producing device as claimed in claim 4, wherein at least one of the flow setting means provided to the supply systems for the air, oxygen, or oxidizing agent and the at least one type of material includes on-off valves connected in parallel.

11. A hydrogen producing device as claimed in claim 10, wherein at least one of the on-off valves is provided with a constant-flow valve connected in series with the on-off valves.

12. A hydrogen producing device as claimed in claim 10, wherein at least one of the on-off valves is provided with a governor connected in series with the on-off valves.

13. A hydrogen producing device as claimed in claim 10, wherein the flow setting means for the air, oxygen, or oxidizing agent is a discharge-controllable blower.

* * * * *